United States Patent [19]
Olsen et al.

[11] 3,744,344
[45] July 10, 1973

[54] CONTROL SYSTEM FOR TRANSMISSION
[75] Inventors: Gerald N. Olsen, Torrance; Arthur R. Washburn, Anaheim, both of Calif.
[73] Assignee: White Motor Corporation, Cleveland, Ohio
[22] Filed: Dec. 7, 1970
[21] Appl. No.: 95,820

[52] U.S. Cl. .................................. 74/687, 74/337.5
[51] Int. Cl. ......................... F16h 47/04, F16h 5/06
[58] Field of Search ............................ 74/687, 337.5

[56] References Cited
UNITED STATES PATENTS
3,293,943  12/1966  MacDonald .......................... 74/687
3,489,036  1/1970   Cockrell et al. ....................... 74/687
3,580,107  4/1971   Orshansky, Jr. ....................... 74/687

Primary Examiner—Arthur T. McKeon
Attorney—Smyth, Roston & Pavitt

[57] ABSTRACT

An engine drives a vehicle through a transmission that incorporates clutches and planetary gearing together with a hydraulic drive unit that variably and reversibly drives a reaction component of the planetary gearing for stepless changes through a series of ranges of vehicle speed. The driver shifts a control handle through positions corresponding to the series of ranges and a control system for the transmission includes servo-means that operates at a predetermined rate to automatically vary the hydraulic drive unit and to engage the various clutches in accord with the changing positions of the control handle.

24 Claims, 25 Drawing Figures

Patented July 10, 1973  3,744,344

INVENTORS:
Gerald N. Olsen
Arthur R. Washburn

ATTORNEYS

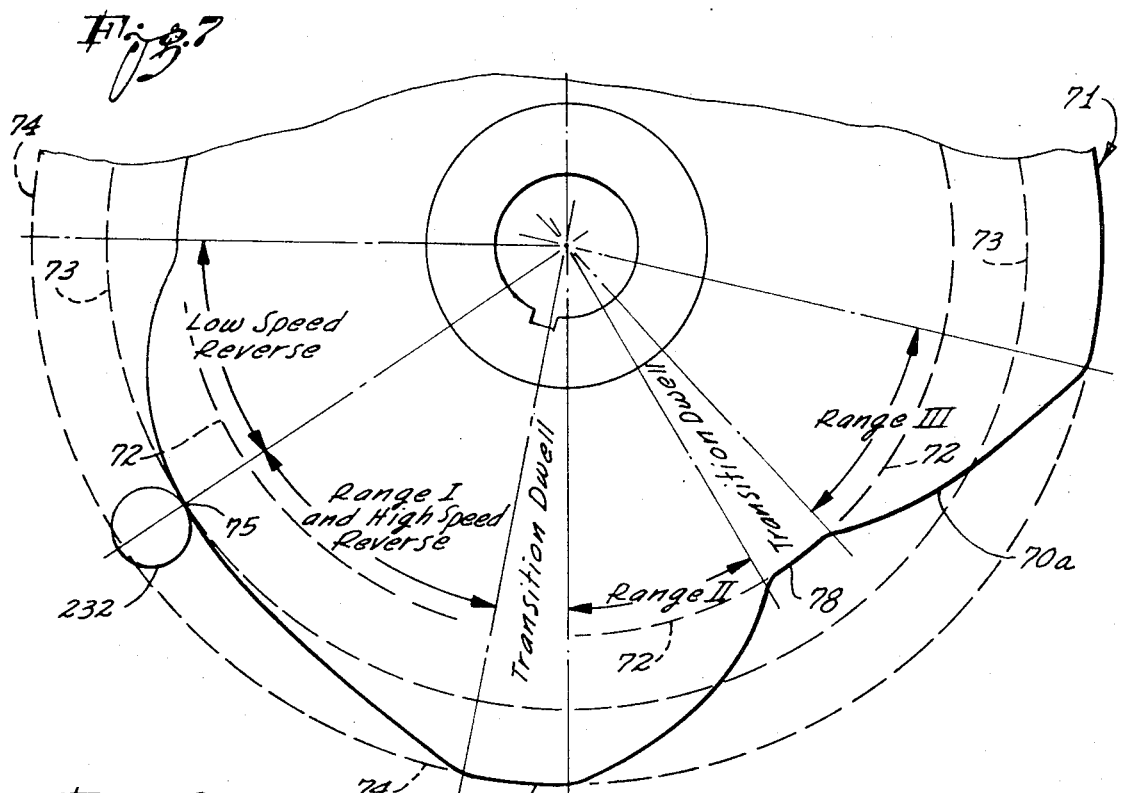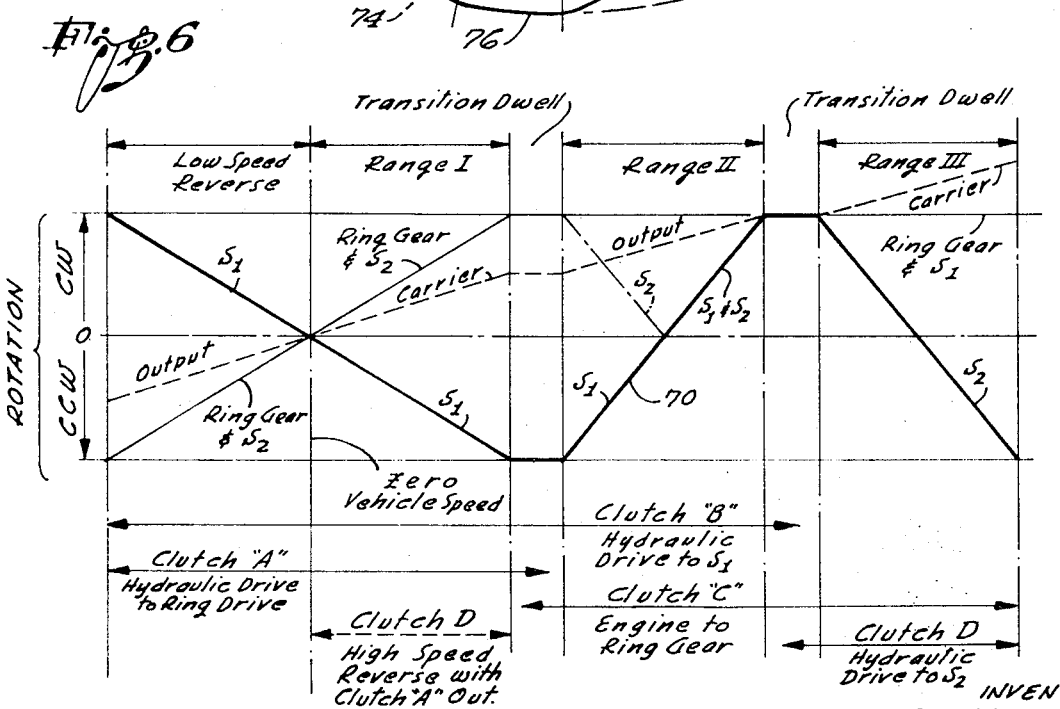

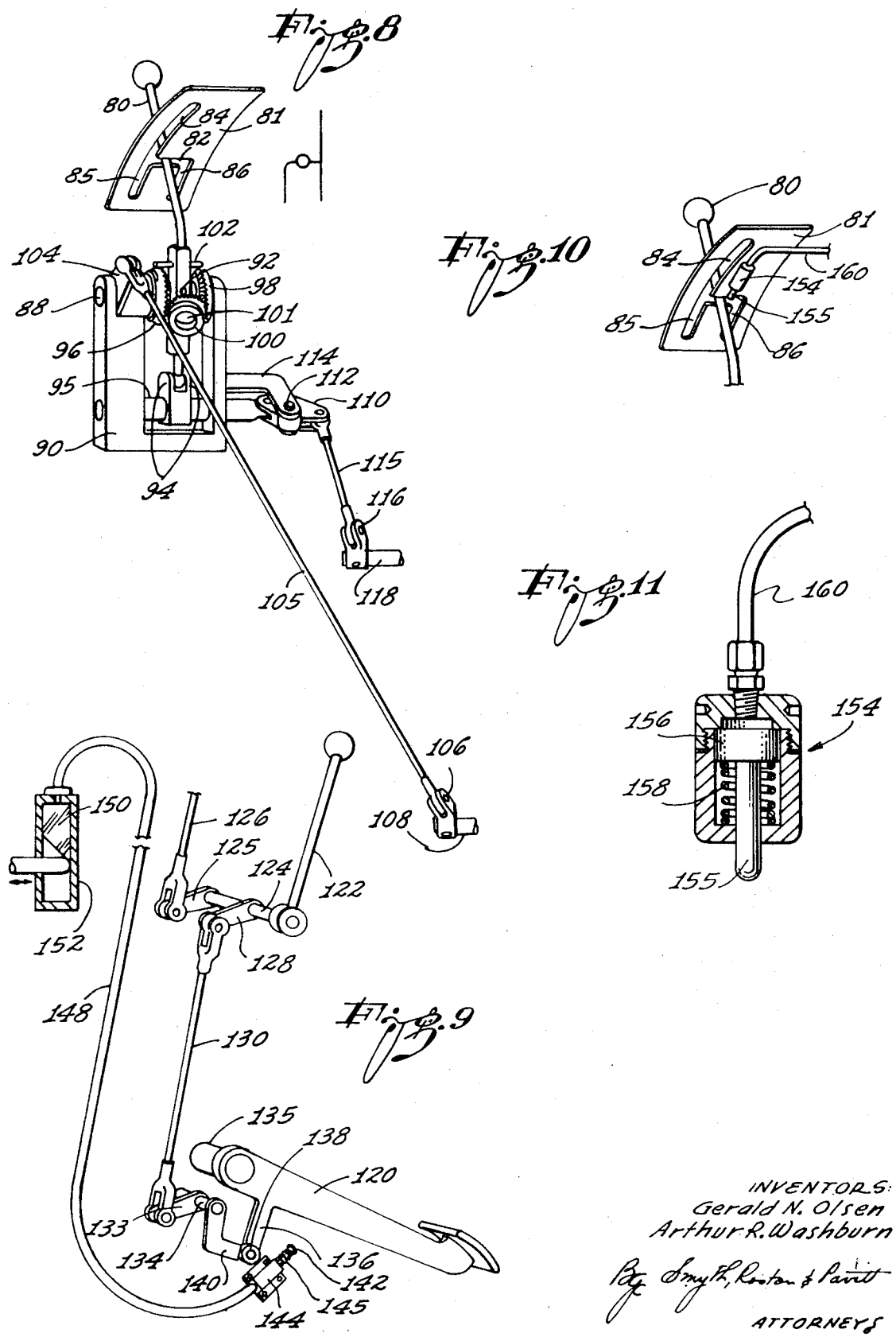

Patented July 10, 1973

INVENTORS:
Gerald N. Olsen
Arthur R. Washburn

ATTORNEYS

Patented July 10, 1973

INVENTORS
Gerald N. Olsen
Arthur R. Washburn

By Smyth, Roston & Pavitt
ATTORNEYS

Fig. 16

Patented July 10, 1973

INVENTORS:
Gerald N. Olsen
Arthur R. Washburn

ATTORNEYS

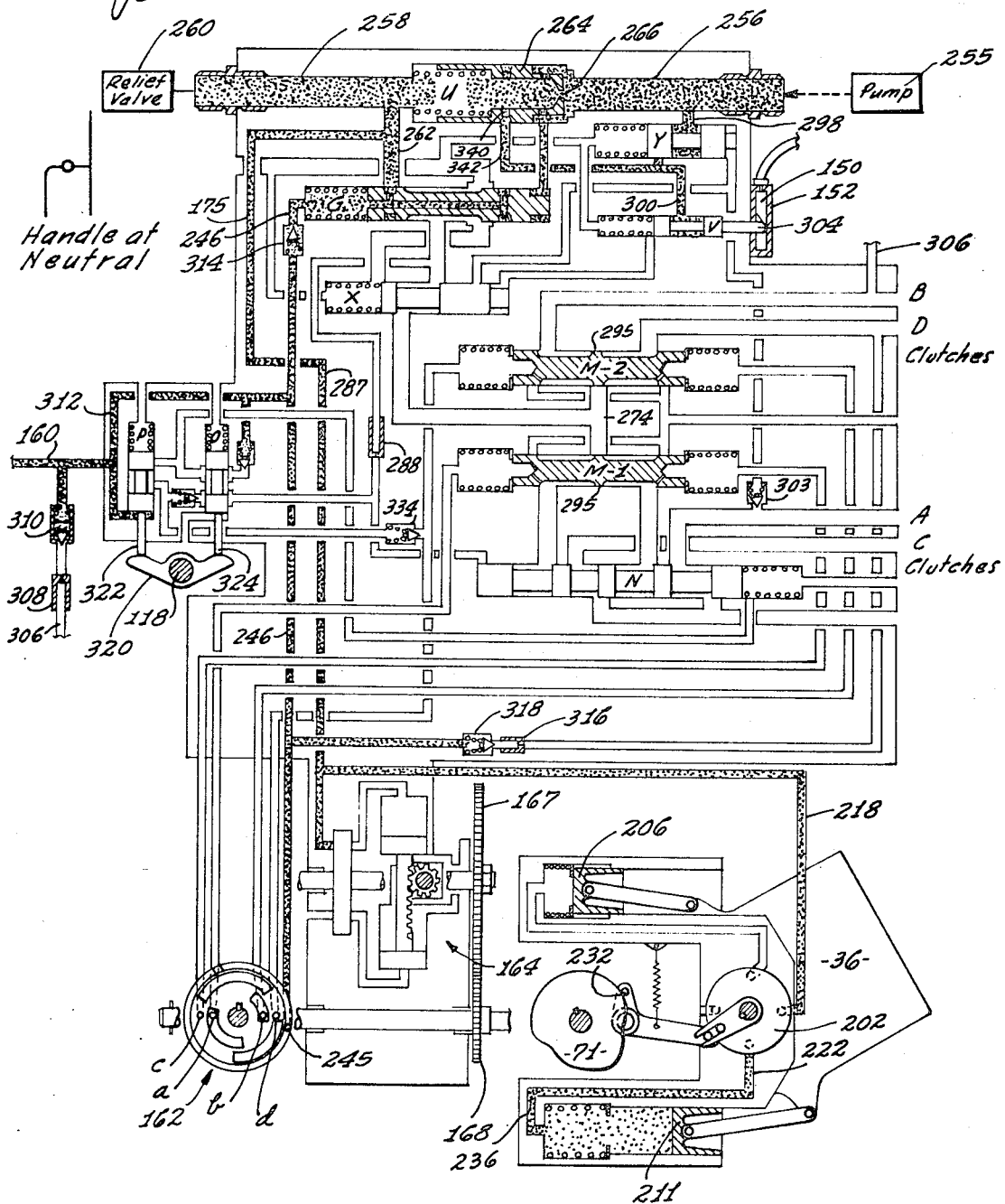

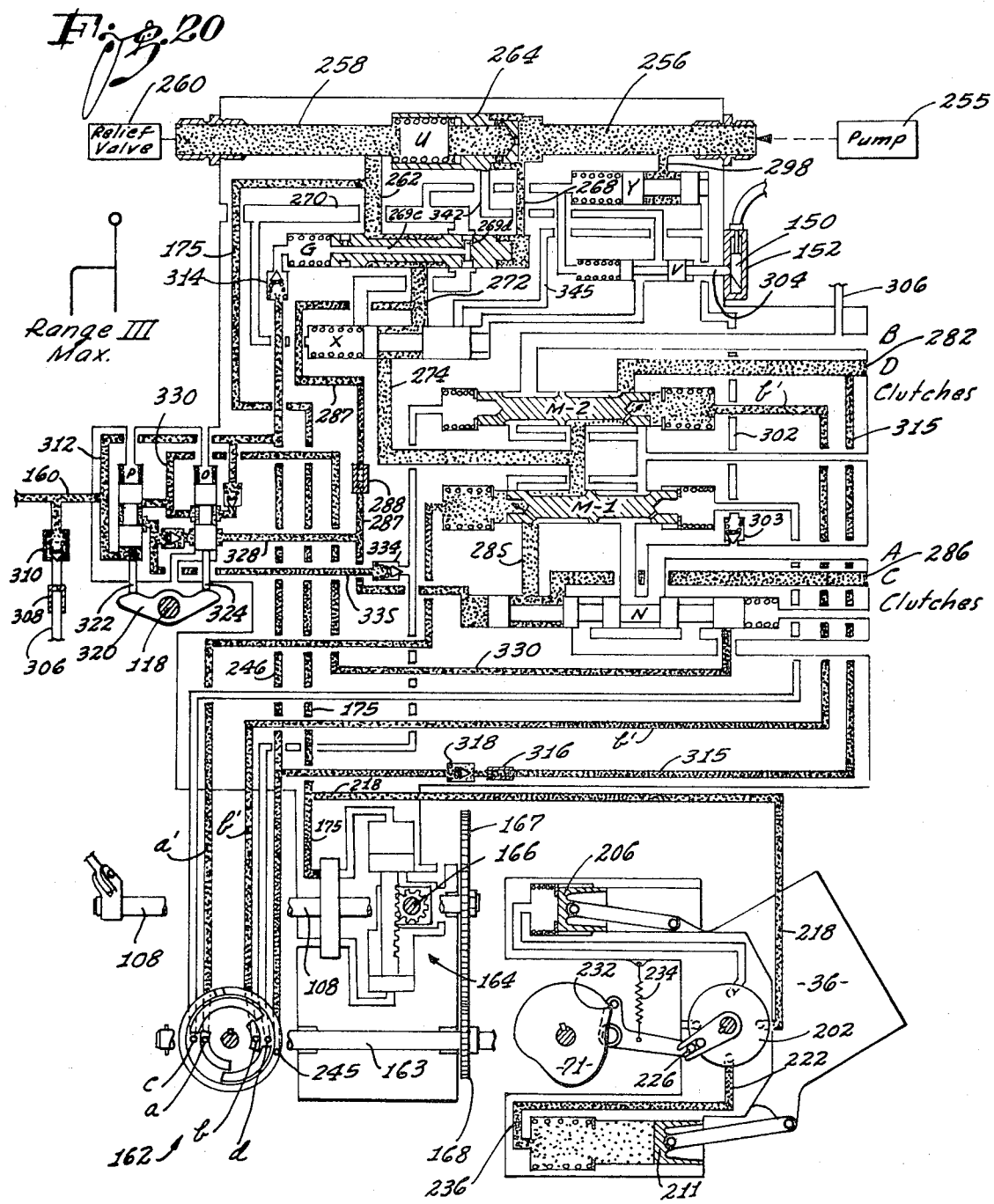

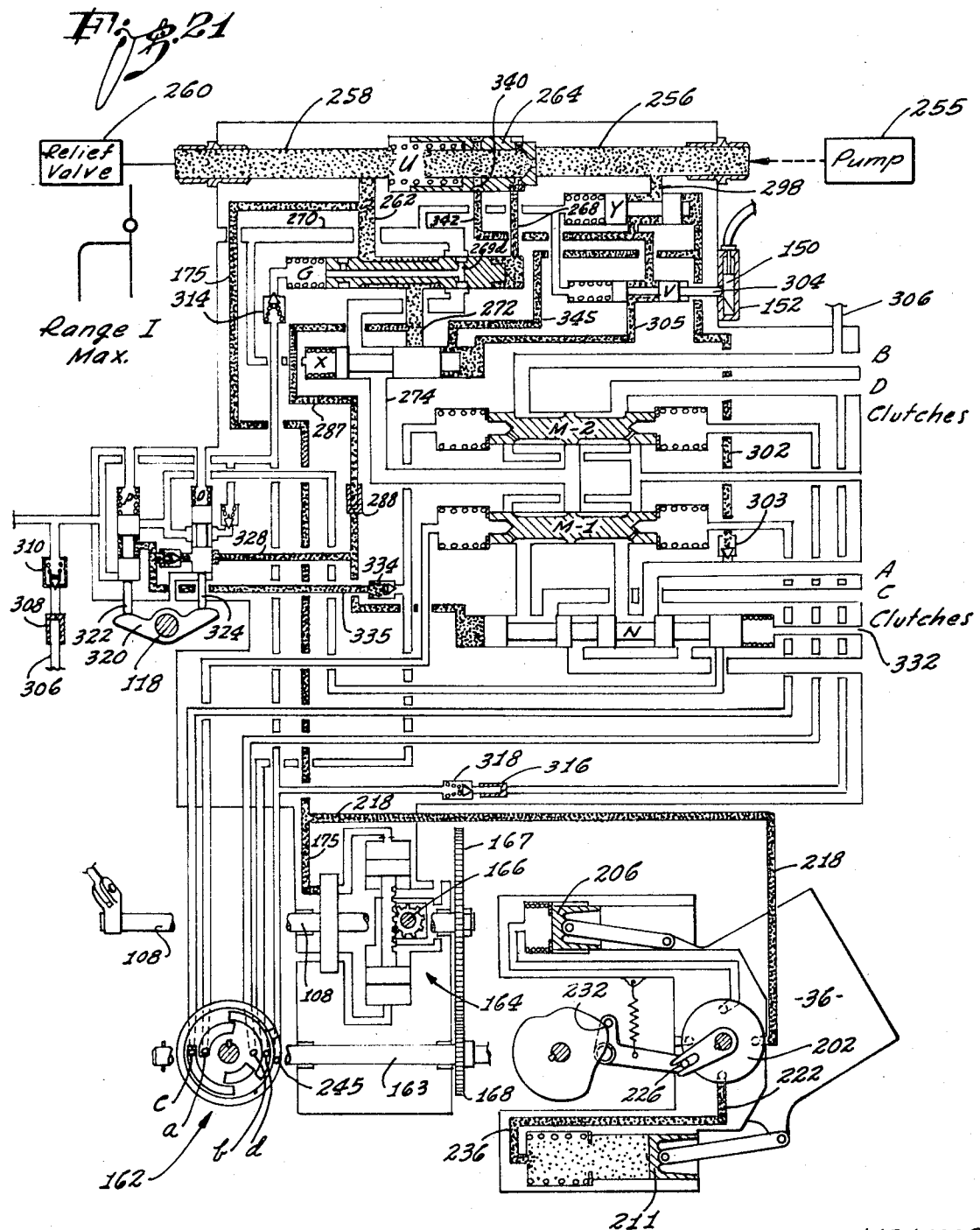

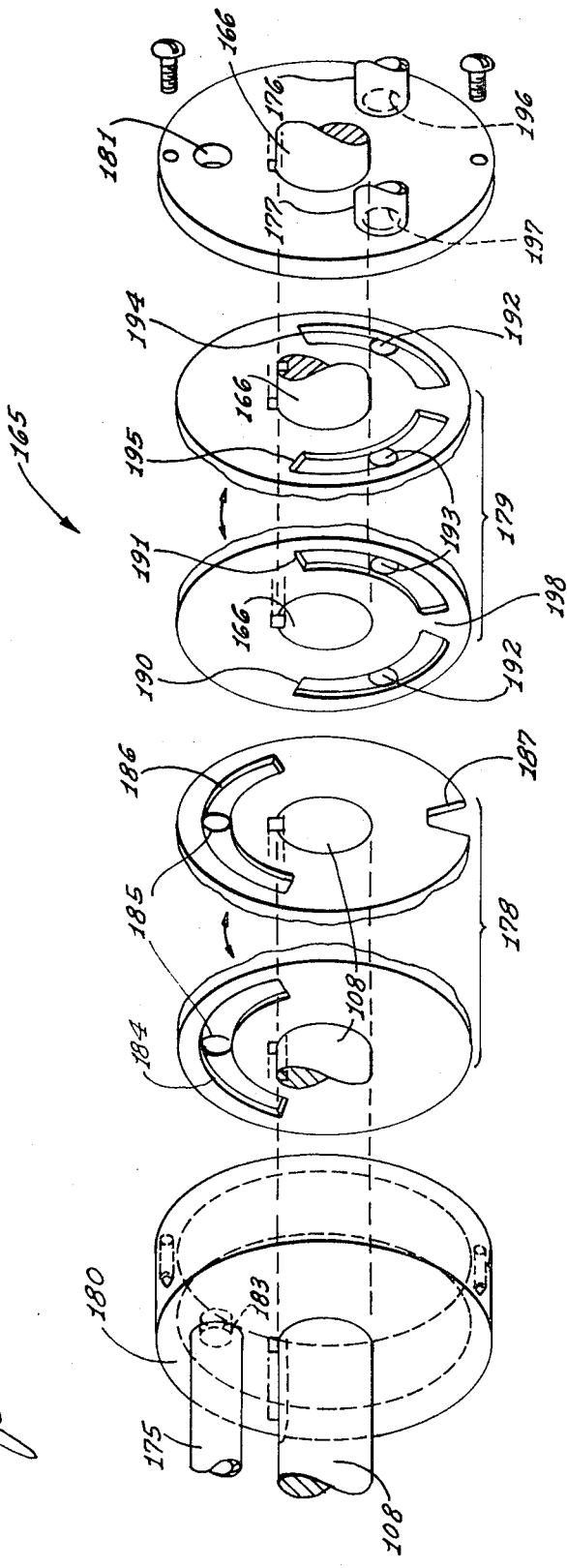

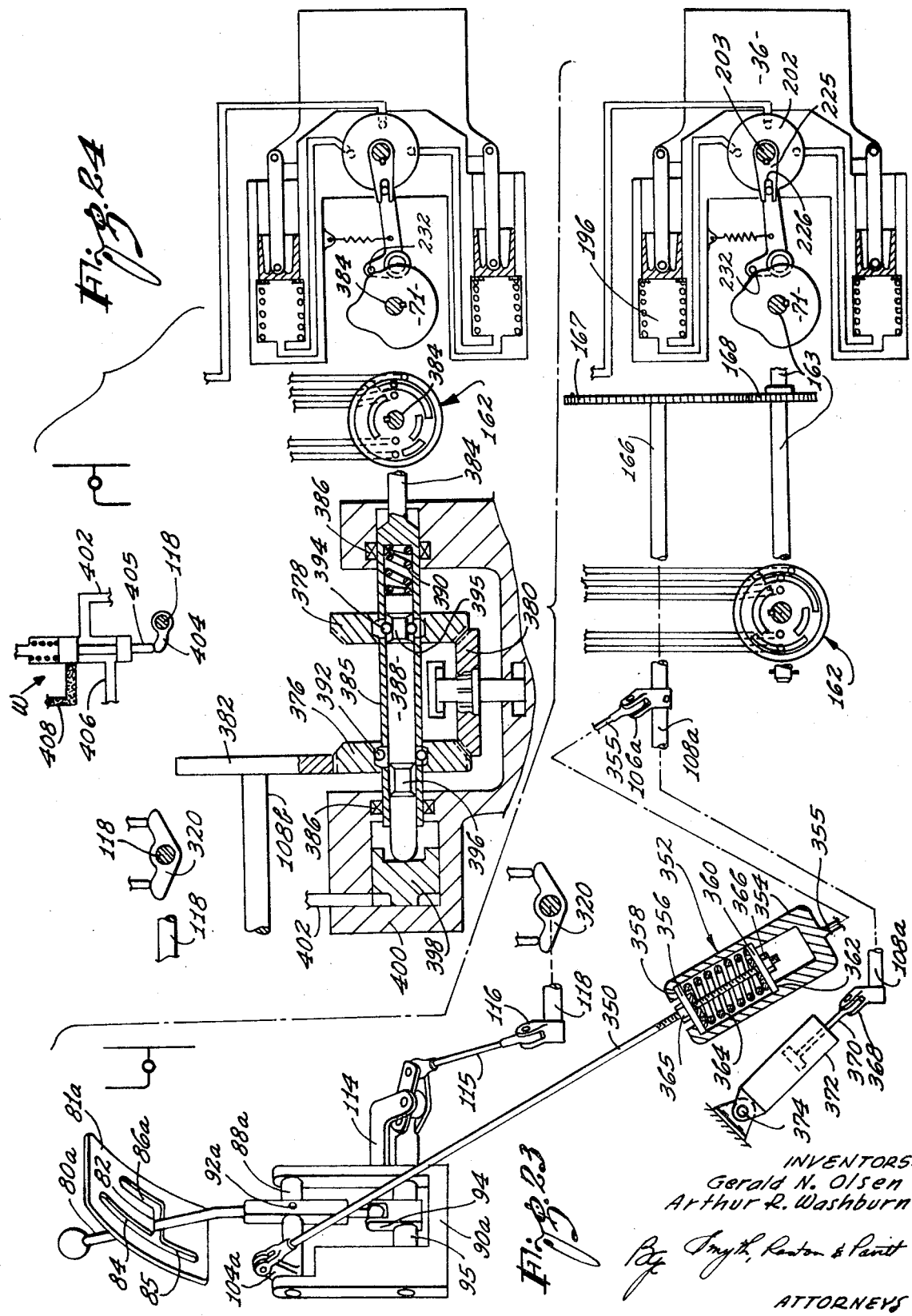

CONTROL SYSTEM FOR TRANSMISSION

BACKGROUND OF THE INVENTION

The invention relates to a continuously variable powered transmission of the general type set forth in the Gunderson et al. U.S. Pat. No. 3,427,899, which patent is hereby incorporated into the present disclosure by reference. The Gunderson transmission, which is especially suited for tractors, incorporates planetary gearing, a hydraulic drive unit for variably and reversibly driving the sun gear of the planetary gearing and further includes seven clutches to provide various paths of power flow through the transmission. An improvement on the Gunderson et al. transmission disclosed in a copending application by Robert B. Singer, Ser. No. 879,390, now U.S. Pat. No. 3,626,787 filed Nov. 24, 1969, adds a second sun gear and a second set of planet gears to make it possible to reduce the number of clutches from seven to four.

Although power flow is transmitted trhogh such a transmission in a stepless manner, the overall speed capability is divided into a series of speed ranges, the hydraulic drive unit being operated in different modes for the different ranges. To shift from range to range, the operating mode of the hydraulic unit must be changed, and where different combinations of clutches are employed in successive ranges, the stepless operation requires that clutches be operated in an overlapping manner for the transition from range to range. It is apparent that the manipulation of the various controls of the transmission for various changes in the vehicle speed is complicated and would place a heavy burden on a tractor operator who needs to be free to place his attention elsewhere. It would be only too easy, moreover, to damage the transmission structure by improper or untimely manipulation of the controls.

In addition to the need for simplifying the manual procedure for controlling the transmission there is need for suitable provision for stopping the vehicle in an emergency. It is to be borne in mind that if need for an emergency stop occurs when the tractor is in high speed, the clutches involved for that speed should be kept engaged for an initial period of retardation of the tractor by the engine.

The broad object of the invention is to provide such a control system in which both the sequential operation of the clutches and the sequential adjustments of the hydraulic drive unit may be made by manual movement of a single master control and abrupt stops may be made by a single emergency control.

SUMMARY OF THE INVENTION

A fluid-pressure-actuated control system including means to vary the adjustment of the hydraulic drive unit of the transmission means to activate the various clutches is energized by a pump that is driven directly by the engine. For emergency stops, the invention employs the rate of output of the pump to sense when the vehicle speed drops sufficiently to warrant release of the clutches. A single manually operable master control is shiftable out of neutral in one lateral direction to a realtively long slot where the lever may be moved forward through three speed ranges or may be moved rearward through a low speed reverse range. The master control may also be shifted from neutral in the opposite lateral direction to a short slot for a high speed reverse range.

The control system includes a first program means to program the required adjustments of the hydraulic drive unit through the ranges of speed of the vehicle and the control system further includes a second program means that is synchronized with the first program means and is movable through a series of positions corresponding to the series of speed ranges of the vehicle to program the engagement and disengagement of the four clutches as required. In the preferred embodiment of the invention, the master control is manually movable by the operator independently of the two program means and servo means causes the two program means to seek positions corresponding to the instant positions of the master control. The preferred embodiment of the invention further includes means to control the rate at which the two program means follw the changes in position of the master control.

The first program means for controlling the adjustment of the hydraulic drive unit comprises a program cam having a control surface that rises and falls to change the adjustment of the hydrostatic drive unit, the slope of the control surface of the cam being in accord with the desired gain control, i.e., change in vehicle speed per unit movement of the cam. The cam has a dwell at the transition between the first and second forward speed range and has a dwell at the transition between the second and third forward speed ranges, the two dwells providing time for the required overlapping of the clutch operations.

The four clutches are activated by fluid pressure and the second program means comprises a program valve which is preferably in the form of a rotary commutator valve to operate the various clutches in the desired sequence. In this regard a feature of the invention is the concept of using two spool valves for the four clutches. The spool of each valve operates two of the clutches alternately by movement of the spool to its alternate limit positions, both clutches being engaged when the spool shifts through a central position. Each spool valve is spring-centered and sufficient fluid pressure is available at both of its ends to overcome the spring pressure. By virtue of this arrangement the program valve may change clutches by simply venting the two ends of the two spool valves selectively.

Two of the four clutches are engaged in each speed range and the same two clutches are used for the low speed reverse range as for the first forward speed range so that it is not necessary to disengage the clutches and go into free wheeling at the transition between these two ranges. This feature makes it possible to inch the vehicle either forward or rearward from zero speed by simply easing the master control forward or rearward while the two clutches are engaged.

At the transition between the first and second speed ranges and again at the transition between the second and third speed ranges, clutches are operated by the program valve in overlapping manner, a third clutch being engaged before one of the two clutches is released. Thus the three clutches are momentarily engaged simultaneously to make possible uninterrupted power flow during the transition.

In the preferred embodiment of the invention the operator has the choice between a low speed reverse range in which the planetary gearing of the transmission is operated differentially and a high speed reverse range in which two of the clutches lock up the planetary gearing for rotation as a unit. A feature of the invention is that the movements of the program cam and of the clutch program valve that are employed for the high speed reverse range are the same movements that are employed for the first range of forward speed. When the master control is shifted to its high speed reverse range the program cam and the program valve both respond by taking positions they normally use for the first forward speed range but means responsive to the shift of the master control intervenes to substitute a combination of clutches that is different from the combination of clutches that is normally used in the first forward speed range.

When the master control moves forward through the first speed range, the program cam also moves forward. It is highly desirable, however, that the master control be moved manually rearward through the high speed reverse range instead of being moved manually forward because rearward movement of the master control is natural to the operator for a reverse speed range. Thus it is desirable that the program cam move forward both in response to forward movement of the master control in the first forward speed range and in response to rearward movement of the master control in the high speed reverse range. The invention solves this problem by providing reverse gearing which reverses the response of the cam to the master control when the master control is shifted laterally from neutral position to its rearward path of movement for the high speed reverse range.

As will be explained, the invention provides various safeguards in the operation of the vehicle. One safeguard disables clutches to insure that the vehicle is in free wheeling whenever the master control is in its neutral position. Another safeguard releases the clutches whenever the engine is stalled and insures that the clutches stay released until the master control is returned to a zero speed position. Another safeguard provides for quick stop of the vehicle in an emergency. If the vehicle is traveling at a relatively low speed when the emergency occurs, all of the clutches are immediately automatically released but if the vehicle is traveling at a relatively high speed when the emergency occurs, the automatic release of the clutches is delayed sufficiently to permit the inertia of the engine to assist in the intitial deceleration of the vehicle.

The features and advantages of the invention may be understood from the following detailed description and the accompanying drawings.

BRIEF DESCRIPTION OF THE DRAWINGS

In the drawings, which are to be regarded as merely illustrative:

FIG. 6 is a diagram showing the changes in speed and the changes in rotation of the various components of the planetary gearing throughout the various speed ranges and further showing the clutches that are engaged for the different speed ranges;

FIG. 7 is a fragmentary face view of a cam which serves as a programmer to program the adjustments of the hydraulic drive unit in its two opposite respects for the speed ranges that are indicated in FIG. 6;

FIG. 8 is a perspective view of a manually operable master control and the associated linkage that are employed in the preferred embodiment of the control system;

FIG. 9 is a perspective view of an emergency stop pedal and associated linkage employed in the control system;

FIG. 10 is a perspective view showing the location of a lockout pin to prevent premature shift of the master control into the high speed reverse range;

FIG. 11 is a diagrammatic view showing the construction of the outkout pin;

FIGS. 12 – 21 are diagrammatic views of the control system in its various modes of operation, the face of the cam being opposite from the face shown in FIG. 6;

FIG. 22 is an exploded view of a servo-positioner employed in the control system;

FIG. 23 is a fragmentary diagrammatic view indicating the construction of a modification of the control system; and FIG. 24 is a fragmentary diagrammatic view indicating the construction of another modification of the control system.

DESCRIPTION OF THE PREFERRED EMBODIMENT OF THE INVENTION

THE TRANSMISSION APART FROM THE CONTROL SYSTEM

Figure 1:
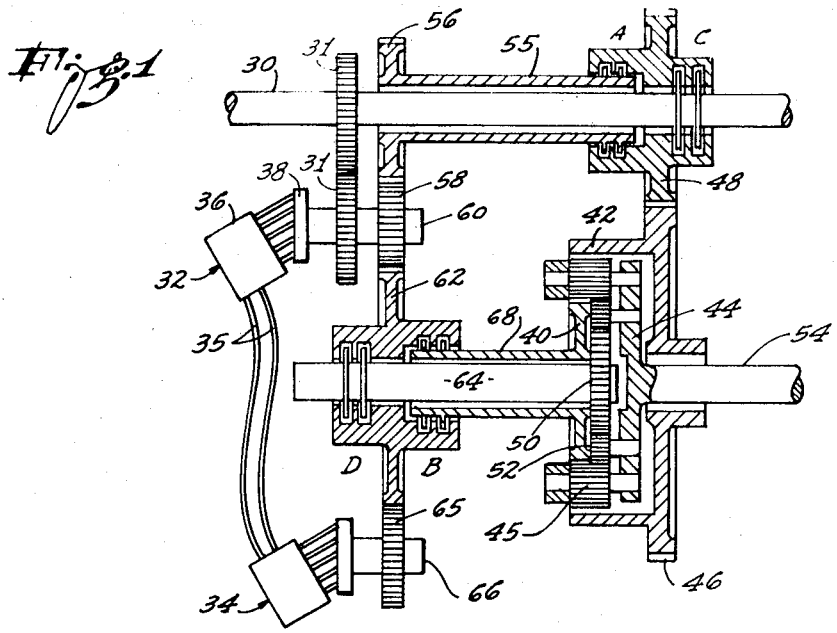
FIG. 1 is a diagrammatic view of the physical structure of the presently preferred embodiment of the transmission separate and apart from the transmission control system.

In FIG. 1 which shows the structure of the presently preferred embodiment of the transmission separate and apart from the control system, an input shaft 30 is permanently mechanically connected by a pair of gears 31 to a first motor-pump 32, which in turn, is hydraulically connected to a second motor-pump 34 by a pair of conduits 35. The two motor-pumps 32 and 34 together constitute an infinitely variable hydraulic drive unit which is reversible in the direction of power flow and is also reversible in output direction without reversal of input direction.

Each of the motor-pumps 32 and 34 is of the axial-piston type and motor-pump 32 has a cylinder block 36 that is tiltable in a well known manner relative to a drive flange 38 for variation in volumetric displacement to vary the speed of the second motor pump. The cylinder block 36 has a center position for zero speed of the second motor pump 34 and may be swung in opposite directions from its zero speed position to actuate the second motor pump in opposite directions. Thus the first motor pump 32 may be adjusted to actuate the second motor-pump 34 at various speeds in either rotary direction. The second motor-pump 34 operates constantly at maximum displacement.

The hydraulic drive unit is combined with a planetary gear assembly that includes a first sun gear 40, a ring gear 42, a planet gear carrier 44 and a set of planet gears 45 mounted on the planet gear carrier 44. For input power flow to the ring gear 42 the ring gear is provided with external input teeth 46 which are in mesh with a gear 48, the gear 48 being rotatably mounted on the input shaft 30. The planetary gearing further includes a second sun gear 50 and a second set of planet gears 52 on the planet gear carrier 44, the second set of planet gears being in mesh both with the second sun gear 50 and with the first set of planet gears 45.

The planet gear carrier 44 is permanently connected to the output shaft 54 of the transmission. The input shaft 30 and the second motor-pump 34 are releasably connected to various parts of the planetary gearing at different stages in the operation of the transmission system. For this purpose four clutches are provided which are designated A, B, C and D.

Clutch A releasably connects the gear 48 to a tubular shaft 55 that surrounds the input shaft 30. The tubular shaft 55 carries a gear 56 that is in mesh with a gear 58 that is freely rotatable on the shaft 60 of the first motor-pump 32 independently of the first motor pump. A gear 62 is freely rotatable on a shaft 64 that carries the second sun gear 50 and the gear 62 is not only in mesh with the gear 58 but is also in mesh with a gear 65 that is keyed to the shaft 66 of the second motor-pump 34. It is apparent that engaging clutch A releasably connects the second motor-pump 34 to the ring gear 42 by activating a gear train that includes gears 65, 62, 58, 56 and 48.

Clutch B releasably connects the gear 62 to a tubular shaft 68 that surrounds the shaft 64 and carries the first sun gear 40 and thus releasably connects the second motor-pump 34 to the first sun gear. Clutch C releasably connects the input shaft 30 to the gear 48 and thus releasably connects the input shaft to the ring gear 42. Clutch D releasably connects the gear 62 to the shaft 64 that carries the second sun gear 50 and thus releasably connects the second motor-pump 34 to the second sun gear.

How the four clutches A – D are variously used in the different speed ranges may be understood by reference to the diagrams in FIGS. 2 – 5 and reference to the chart in FIG. 6, in all of which the first sun gear 40 is designated $S_1$ and the second sun gear 50 is designated $S_2$. In FIGS. 2 – 5 the clutch connections to the various parts of the planetary gearing are shown diagrammatically and FIG. 6 indicates the directions of rotation and the relative speeds of the different components of the planetary gearing throughout the series of speed ranges. FIG. 6 also indicates the sequence in the operation of the four clutches in the series of speed ranges. Note that FIG. 6 shows transition stages between the first and second speed ranges and between the second and third speed ranges with overlapping operation of clutches indicated in each transition.

Figure 2:
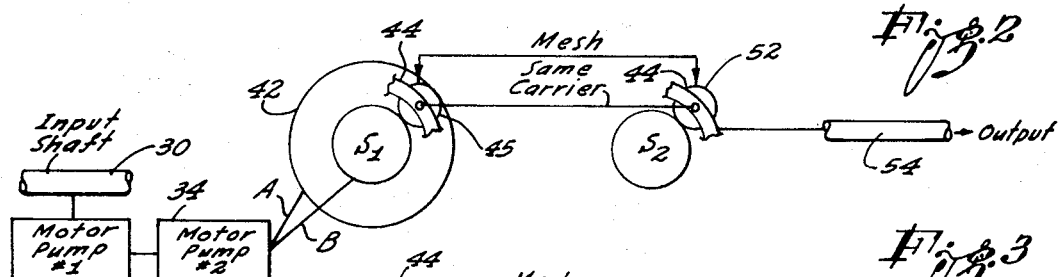
FIG. 2 is a diagram of the transmission shown in FIG. 1, the diagram showing the clutches that are engaged for the first range of forward speed, the same clutches being employed for low speed reverse.

In both the first forward speed range and in the low speed reverse range, both of which are represented by FIG. 2, the second motor-pump 34 is connected by clutch A to the ring gear 42 and is also connected by the clutch B to the first sun gear $S_1$ to cause the first sun gear and the ring gear to rotate in opposite directions. With the vehicle standing still and with the tiltable cylinder block 36 of the first motor-pump 32 at its center position for zero displacement, the input shaft 30 is rotated by the vehicle engine at maximum speed without transmitting power to the planetary gearing. To start transmission of power, the cylinder block 36 of the first motor-pump 32 is progressively tilted in one direction to accelerate the ring gear 42 in one direction for the first forward speed range or the cylinder block is progressively tilted in the opposite direction to accelerate the ring gear in the reverse direction for the low speed reverse range. Since the clutches A and B are both engaged when the cylinder block is at its zero speed, the vehicle may be inched either forward or rearward by simply slightly swinging the cylinder block out of its center position.

At the upper end of the first or lowest forward speed range where the first motor-pump 32 is operating at full displacement, both of the two motor-pumps operate at the same speed to make possible a transition to the second forward speed range by overlapping clutch operation without interrupting the power flow to the output shaft 54. To make this transition clutch C is engaged while clutches A and B are engaged and then clutch A is disengaged to leave the two clutches B and C engaged.

Figure 3:
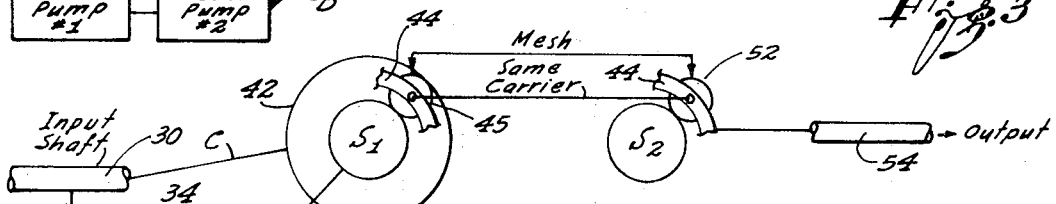
FIG. 3 is a similar diagram showing the clutches that are engaged for the second forward range of speed.
Figure 4:
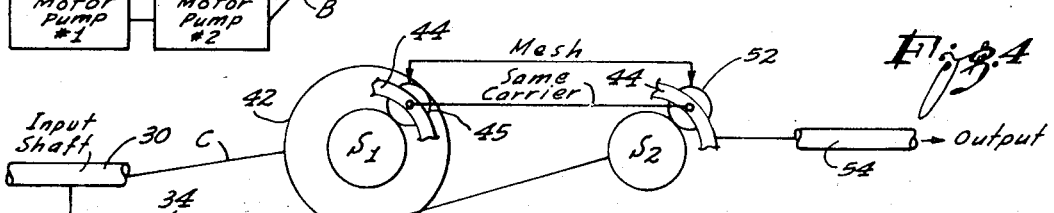
FIG. 4 is a similar diagram showing the clutches that are engaged for the third forward speed.

Assume that at the start of the second forward speed range when clutches B and C are both engaged as shown in FIG. 3 and as indicated in FIG. 6, the first sun gear $S_1$ is rotating counterclockwise at maximum speed and the second sun gear $S_2$ is rotating clockwise at maximum speed. To progress through the second speed range, the counterclockwise rotation of the first sun gear $S_1$ and the clockwise rotation of the second sun gear $S_2$ are both decelerated to zero at the mid point of the range. To progress through the upper half of the speed range from the mid point, the two stationary sun gears $S_1$ and $S_2$ are both progressively accelerated in the clockwise direction. Thus to carry out the full extent of the second forward speed range the cylinder block 36 of the first motor pump 32 is progressively tilted from one limit position through a zero speed position to the opposite limit position. Up to the mid point of the speed range the two sun gears rotate oppositely until both are stationary at the mid point and then both sun gears accelerate in unison to maximum clockwise rotation at the end of the range as indicated in FIG. 6. Throughout this second forward speed range, the second sun gear $S_2$ and the second set of planet gears 52 rotate freely without transmitting torque.

As indicated in FIG. 6, the two sun gears $S_1$ and $S_2$ and the ring gear 42 all rotate clockwise at the same maximum speed at the upper end of the second speed range. Therefore a transition to the higher third forward speed range may be carried out without interruption in torque output by simply operating clutches D and B in overlapping sequence. As indicated in FIG. 6, with clutches B and C engaged at the start of the transition, clutch D is also engaged early in the transition. Later in the transition clutch B is disengaged to leave clutches C and D engaged for the third forward speed range. During this transition in which the output from the second motor-pump 34 is transferred by clutch operation from sun gear $S_1$ to sun gear $S_2$, the temporary simultaneously engagement of clutches B and D temporarily locks up the planetary gearing and the planetary gearing rotates as a unit with no relative rotation among its components.

With the second sun gear $S_2$ rotating clockwise at maximum speed at the beginning of the third forward speed range, the volumetric displacement of the first motor-pump is gradually reduced to decelerate the rotation of the second sun gear $S_2$ to zero at the mid point of the range as indicated in FIG. 6. Then for the second half of the third speed range the cylinder block of the first motor-pump 32 is swung past center in the opposite direction to accelerate the second sun gear $S_2$ from zero speed to maximum speed in counterclockwise direction.

The manner in which the vehicle speed is increased in the third speed range may be understood when it is considered that the input shaft 30 imparts speed through the ring gear 42 to the first set of planet gears 45 for transmission by the planet gears 45 to the planet gear carrier 44 and at the same time the hydraulic drive unit in driving the second sun gear $S_2$ imparts additional speed to the first set of planetary gears 45 through the second set of planetary gears 52. Thus, the first set of planetary gears 45 imparts the sum of the two speeds to the planet gear carrier 44.

Figure 5:
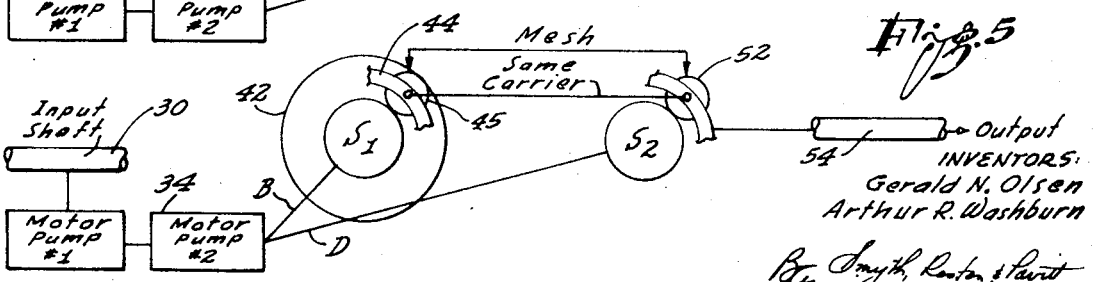
FIG. 5 is a similar diagram showing the clutches that are engaged for high speed reverse.

FIG. 5 shows how the transmission may be employed in a different manner for high speed reverse operation. The connections in FIG. 5 provide less output torque for reverse speed than the connections shown in FIG. 2 but permit the reverse speed range to be extended. With the second motor-pump 34 stationary because the first motor-pump 32 is adjusted for zero displacement, the output shaft 54 is stationary. Clutch B is engaged to connect the stationary second motor-pump 34 to the stationary first sun gear $S_1$ and clutch D is engaged to connect the stationary second motor-pump additionally to the stationary second sun gear $S_2$. Consequently the planetary gearing is locked up to rotate as a unit. The cylinder block 36 of the first motor-pump 12 is then swung from its zero speed position to cause reverse acceleration of the second motor pump 34, which reverse acceleration is transmitted through the locked planetary gearing to the output shaft 54.

THE BASIC CONCEPT OF THE CONTROL SYSTEM

An important teaching of the invention is that the preparation of the graph shown in FIG. 6 is a basic approach to the development of suitable program means for an automatic control system. Since the heavy line or curve, designated 70, represents the required adjustments of the hydraulic drive unit over the series of speed ranges, a first program means may comprise essentially a programmer in the form of a program cam of a configuration corresponding to the configuration of curve 70 to carry out the sequential adjustments of the hydraulic drive unit. A second program means may comprise a programmer in the form of a suitable commutator valve synchronized with the cam to carry out the sequential operation of the clutches.

The operator may manipulate a single master control through a series of ranges of positions corresponding to the speed ranges of the transmission with the two program means following the changes in positions of the master control. In the preferred practice of the invention the master control is freely movable in complete independence of the two program means and suitable servo means causes the two program means to seek adjustments corresponding to the instant positions of the master control. In addition the preferred control system incorporates suitable means to control the rate at which the two program means respond to the master control, the servo means functioning with a delayed action that limits the rate at which the vehicle may be accelerated by the control system.

The invention also takes advantage of the fact that the portion of the curve 70 in FIG. 6 that lies within the forward speed range I is also applicable to the high speed reverse range. Accordingly, a feature of the invention is that the corresponding portion of the program cam is employed both for the first forward speed range and for the high speed reverse range. Thus FIG. 6 indicates by a dotted line how clutch D may be used along with clutch B for high speed reverse.

FIG. 7 is a fragmentary face view of a rotary program cam, generally designated 71, having a working surface 70a that conforms in configuration to the curve 70 of FIG. 6. In FIG. 7 the dotted line 72 indicates the minimum radius of the working surface 70a which corresponds to the maximum clockwise rotation of a sun gear; the dotted line 73 is the intermediate radius that corresponds to zero speed of a sun gear; and the dotted line 74 is the maximum radius that corresponds to maximum speed counterclockwise rotation of a sun gear. It can be seen in FIG. 7 that from the point 75 of the cam surface that corresponds to zero vehicle speed the cam drops to the minimum radius 72 at the outer limit of the low speed reverse range and in the other direction climbs to the maximum radius 74 at the upper end of the first forward speed range. Thus the slope of the cam surface 70a in FIG. 7 corresponds to the slope of the line 70 in these two speed ranges in FIG. 6.

The cam has a dwell 76 at its outer radius 74 which corresponds to the transition in FIG. 6 between range I and range II, the dwell providing a time-interval for the required overlapping operation of clutches. From the dwell 76 the cam surface drops back to the minimum radius 72 at the end of the second speed range and a second dwell 78 on the minimum radius 72 provides the transition shown in FIG. 6 between the second and third speed ranges. In the third speed range the cam surface 70a climbs from the minimum radius 72 to the maximum radius 74 in accord with the required change in speed of the second sun gear $S_2$ in the third speed range in FIG. 6.

STRUCTURE OF THE PREFERRED EMBODIMENT OF THE CONTROL SYSTEM

The construction of the presently preferred embodiment of the control system may be understood by referring to FIGS. 8 – 21. FIG. 8 shows a manually operable master control 80 and associated linkages that connect the master control to the control system package. The master control 80 is in the form of a handle that combines the functions of a gear shift means and a speed-ratio control means. The handle 80 extends through a panel 81 adjacent the operator's seat, the panel being formed with suitable slots that determine the paths of movement of the handle. The handle is shown at a central neutral position in a transverse slot 82, at which position the vehicle is in free wheeling. FIG. 8 shows in perspective the panel 81 as viewed, not from the operator's seat, but from a view point well forward of the operator. Thus right and left as viewed in the perspective are the reverse of right and left as viewed by the operator. To avoid confusion the small diagram in the upper right hand corner of FIG. 8 shows the pattern of slots in the panel as viewed by the operator and hereafter the terms right and left will refer to this small diagram and similar small diagrams in FIGS. 12 – 21.

When the handle is moved to the right end of the transverse slot 82 it is in at a zero speed position from which it may be moved forward in a forward slot 84 through the forward speed ranges I, II and III or from which it may be moved rearward through a rearward slot 85 for the low speed reverse range. From the neutral position shown in FIG. 8 the handle may also be moved to the left end of the transverse slot 82 to a zero position at the beginning of a rearwardly extending slot 86 which represents the high speed reverse range.

The base portion of the handle 80 straddles a transverse shaft 88 that is journalled in a support bracket 90 and the handle is pivotally connected to the shaft by a pin 92 that extends diametrically through the shaft. Thus the handle may be rocked in the plane of the diametrical pin 92 to rotate the shaft 88 and may be rocked transversely about the axis of the pin without causing rotation of the shaft.

Below the shaft 88 the lower end of the arm 80 is confined between a pair of ears 94 on a shaft 95 that is slidably keyed in the support bracket 90. In addition, an interlock (not shown) is built into the support bracket 90 which engages when shaft 88 is rotated away from neutral position. Thus oscillation of the handle 80 about the axis of the diametrical pin 92 is translated into longitudinal shift of the shaft 95.

A bevel gear 96 on the right side of the handle 80 is keyed to the shaft 88 and a second bevel gear 98 on the left side of the handle is freely rotatable on the shaft. A third small bevel gear 100 is journalled on an arm 101 that extends radially of the shaft 88 from the master control and this gear is in mesh with both of the bevel gears 96 and 98. The handle is provided with a transverse pin 102 that is parallel with the axis of the shaft 88 and the opposite ends of the pin overhang the two bevel gears 96 and 98 respectively. At the central neutral position of the handle 80 that is shown in FIG. 8 the opposite ends of the pin 102 partially seat in corresponding recesses in the two bevel gears 96 and 98. When the handle is swung rightward from its neutral position to the right slots 84 and 85 of the panel, the right end of the cross pin 102 moves deeper into the recess of the right bevel gear 96 while the left end of the cross pin rises out of engagement with the left bevel gear 98. When the handle is swung forward and rearward in the slots 84 and 85 it causes corresponding rotation of the shaft 88. On the other hand when the handle is swung to the left to the high speed reverse slot 86 of the panel, the right end of the cross pin 102 rises out of engagement with the right bevel gear 96 while the left end of the cross pin moves into deeper engagement with the notch of the left bevel gear 98 and then movement of the handle in the slot 86 causes reverse rotation of the shaft 88. Thus rearward movement of the handle in the high speed reverse slot 86 causes the shaft 88 to rotate in the same direction as forward movement of the handle in the forward speed slot 84.

An arm 104 fixedly mounted on the shaft 88 is connected by a link 105 to a corresponding arm 106 of an input shaft 108 of the control system package. Thus rotation of the shaft 88 causes corresponding rotation of the input shaft 108.

The slidable shaft 95 is pivotally connected to one arm of a lever 110 that is mounted by a pivot 112 on a fixed angular bracket 114 and the other arm of the lever is connected by a link 115 to a radial arm 116 on a second input shaft 118 of the control system package. Thus movement of the master control handle 80 about the axis of the shaft 88 cause corresponding rotation of the first input shaft 108 of the control system package and independently thereof movements of the master control handle about the axis of the diametrical pin 102 are translated into rotation of the second input shaft 118 of the control system package.

FIG. 9 shows how an emergency foot pedal 120 provides a third input into the control system package to make possible an emergency stop. In FIG. 9 a manually operable throttle handle 122 which is shown at the full throttle position for maximum engine speed is keyed to a transverse shaft 124 and a rocker arm 125 on the shaft is connected by a link 126 to the engine throttle in a well known manner. A second arm 128 on the shaft 124 is connected by a link 130 to an arm 133 on a countershaft 134. The pedal 120 which is mounted on a pivot 135 has a downwardly extending arm 136 which carries a roller 138. The roller lies in the arcuate path of an angular arm 140 that is fixedly mounted on the countershaft 134. The foot pedal 120 is suitably spring biased to seek the elevated position shown in FIG. 9 at which it does not interfere with forward movement of the throttle handle 122 to its full throttle position. If the foot pedal is depressed in opposition to its spring bias, however, it acts on the angular arm 140 of the countershaft 134 to swing the throttle handle 122 rearward to idle the engine.

Below the foot pedal 120 a plunger 142 extends upward from a fixed bracket 144 and is normally held at its upwardly extending position by a coil spring 145 which is in compression between the fixed bracket and a suitable washer on the end of the plunger. The plunger 142 is unitary with one end of a flexible input cable that is slidable in a tube 148, the flexible cable being terminally connected to a linear cam 150 that is slidable in a guide 152 on one side of the control system package. Thus when the foot pedal 120 is depressed for an emergency stop it cuts down fuel to the engine and at the same time advances the linear cam 150 for an input to the control system package.

In the preferred embodiment of the invention, suitable means is provided to prevent the master control 80 from being shifted out of its central neutral position to the high speed reverse slot 86 unless the control system package is adjusted for zero speed. For this purpose FIG. 10 shows how a small hydraulic cylinder 154 may be fixedly mounted on the underside of the panel 81 with what may be termed a lockout pin 155 partially extending from the cylinder. The lockout pin is normally retracted sufficiently to avoid interfering with the movement of the master control 80 out of its central neutral position into the high speed reverse slot 86. If the transmission is at zero speed adjustment the lockout pin 155 is retracted out of the way but at all other times the lockout pin extends into the transverse slot 82 across the path of left and right movement of the handle to block the handle. Thus if the operator attempts to shift the master control 80 to the high speed reverse slot 86 prematurely or attempts to shift the master control out of the high speed reverse slot prematurely, the lockout pin 155 keeps him from making the shift.

As shown diagrammatically in FIG. 11, the lockout pin 155 is carried by a piston 156 that is slidably mounted in the cylinder 154 and is normally retracted by a coil spring 158. A conduit 160 supplies fluid under pressure to the cylinder 154 to control the lockout pin.

Figure 12:
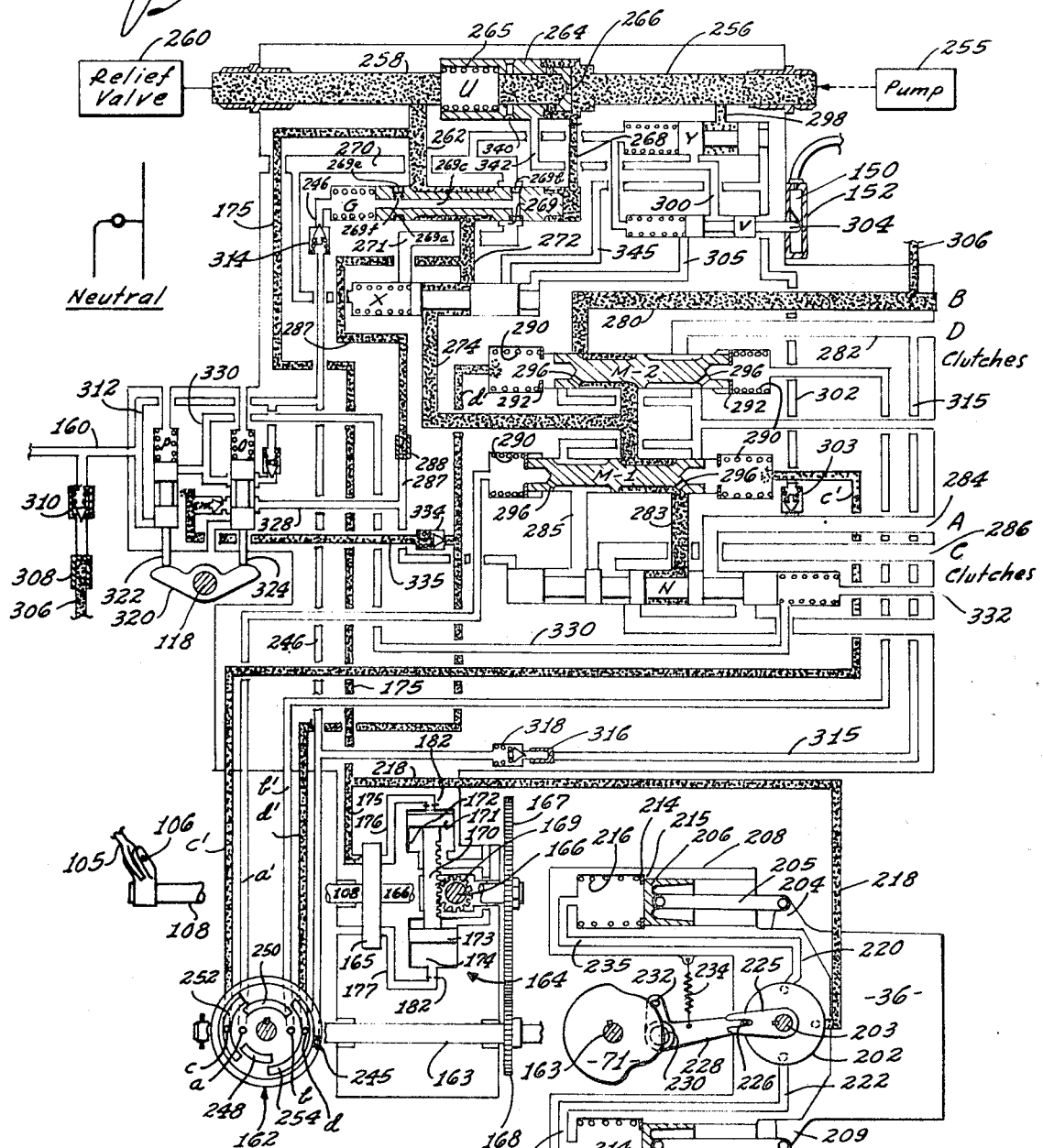

The control system package which is shown diagrammatically in FIGS. 12 – 21 incorporates a number of fluid passages which may be economically formed by suitable bores in solid metal. FIG. 12 shows the previously mentioned cam 71 for programming the adjustments of the hydraulic drive unit and also shows a rotary commutator valve 162 that is synchronized with the cam to program the engagement and disengagement of the four clutches as required for the different speed ranges. In the construction shown the program cam 71 and the commutator valve 162 are mounted on a common program shaft 163 for rotation in unison.

In accord with the teaching of the invention a suitable servo-positioner shown diagrammatically in FIG. 22 is provided to cause the program shaft 163 to seek rotary positions that correspond to the instant positions of the master control 80 with respect to its forward and rearward movements in the slots 84, 85 and 86 of the panel 81. For this purpose the servo-positioner includes a rotary four-way valve 165 that has its input connected to the previously mentioned input shaft 108 from the master control handle 80 and has its output side connected to a countershaft 166. The countershaft 166 is operatively connected to the program shaft 163 by a relatively large gear 167 in mesh with a relatively small gear 168 for amplified rotation of the program shaft.

The servo-positioner further includes a pinion 169 that is keyed to the countershaft 166 and meshes with the teeth of a rack 170. One end of the rack 170 is unitary with a piston 171 in a cylinder 172 and the other end is unitary with a piston 173 in a cylinder 174. A passage 175 supplies fluid under pressure to the four-way valve 165 and two passages 176 and 177 connect the four-way valve to the two cylinders 172 and 174, respectively.

The four-way valve 165 may be of the construction indicated in FIG. 22 wherein an input disc 178 that is keyed to the input shaft 108 and an output disc 179 that is keyed to the countershaft 166 are confined face-to-face in a casing having two opposite end walls 180 and 181. The two valve discs 178 and 179 have normal positions of rotation relative to each other at which they cooperate to cut off the two passages 176 and 177 to cause the countershaft 166 to be stationary at whatever position it may be at the time. If the input disc 178 is rotated by the input shaft 108 in either direction out of its normal position relative to the output disc 179, pressurized fluid is admitted to one of the passages 176, 177 to cause the output disk 179 to rotate in the same direction to restore the normal relative positions of the two discs. Thus the output disc 179 functions as a slave to follow changes in rotation of the input shaft 108 and thus cause corresponding rotation of the countershaft 166 and corresponding amplified rotation of the program shaft 163.

As heretofore indicated, it is preferable to provide suitable retarding means to control the rate at which the program shaft 163 rotates to follow the rotations of the input shaft 108. In this particular embodiment of the invention, the means to control the rate comprises restrictions 182 at the entrances to the two cylinders 172 and 174 respectively.

Referring to FIG. 22 for details of the structure of the four-way valve 165, the previously mentioned supply passage 175 is connected to an inlet port 183 in the end wall 180. The outer face of the input disc 178 abuts the end wall 180 and has an arcuate groove 184 which registers with the inlet port 183 throughout a substantial range of relative rotation between the two discs. This range of rotation may be approximately 100°. A bore 185 in the input disc places the arcuate groove 184 on the outer face of the disc in communication with a similar and coextensive arcuate groove 186 on the inner face of the disc. The inner face of the input disc 178 is further formed with a radial recess 187 that is diametrically opposite from the arcuate groove 186 and serves as a relief port to release fluid to the exterior of the valve.

The inner face of the output disc has two arcuate grooves 190 and 191 and two corresponding bores 192 and 193 which place these arcuate grooves in communication with two corresponding arcuate grooves 194 and 195 on the outer face of the disc. Two ports 196 and 197 in the second end wall 181 of the 4-way valve communicate respectively with the previously mentioned passages 176 and 177 that lead to the two cylinders 172 and 174 respectively.

By virtue of the described arrangement, the inlet port 185 in the first end wall 180 is in continuous fluid communication with the arcuate groove 186 on the inner face of the input disc 178 and the two ports 196 and 197 in the second end wall 181 of the 4-way valve are in continuous communication with the two arcuate grooves 190 and 191 on the inner face of the output disc 179. Normally the two arcuate grooves 190 and 191 of the output disc 179 are cut off from the radial release recess 187 by a land 198 that separates the two arcuate grooves.

Starting with the two discs in their normal positions relative to each other shown in FIG. 22, rotation of the input disc 178 in one direction causes the arcuate groove 186 on the inner face of the input disc to partially overlap the arcuate groove 190 on the inner face of the output disc to cause pressurized fluid to reach the corresponding port 196 by the following path: input port 183, arcuate groove 184 on the outer face of the input disc 178, bore 185 through the input disc, arcuate groove 186 on the inner face of the input disc, arcuate groove 190 on the inner face of the output disc 179, bore 192 through the output disc, and arcuate groove 194 on the outer face of the output disc. At the same time, the release recess 187 in the outer face of the input disc 178 is shifted away from the land 198 to overlap the arcuate groove 191 in the inner face of the output disc to open an exhaust path from the port 197. The exhaust path comprises the arcuate groove 195 in the outer face of the output disc, bore 193 through the output disc, arcuate groove 191 in the inner face of the output disc and release recess 187 in the inner face of the input disc.

Contrary rotation of the input disc from the starting positions supplies pressurized fluid to port 197 and releases fluid from port 196. Additional bores and recesses may be provided in the two discs to hydrostatically balance all axial forces acting on the discs.

FIG. 12 shows diagrammatically the previously mentioned cylinder block 36 of the first motor pump 32 together with a second servo-positioner, that is controlled by the cam 71, the face of the cam shown in FIG. 12 being opposite from the face shown in FIG. 7. The servo-positioner is effective to tilt the cylinder block as required to vary the speed and direction of the output of the second motor pump 34 thereby to vary the speed and direction of either of the two sun gears to which the second motor pump may be connected. This second servo-positioner includes a four-way rotary valve 202 that is responsive to the cam 71 and includes fluid-pressure-actuated means responsive to the rotary valve to control the cylinder block 36.

As shown diagrammatically in FIG. 12, the cylinder block 36 is fixedly mounted on a shaft 203 for rotation and has an ear 204 on one side that is connected by a link 205 to a piston 206 in a cylinder 208 and on the other side an ear 209 of the cylinder block is connected by a link 210 to a piston 211 in a second cylinder 212. At the zero speed position of the cylinder block 36 that is shown in FIG. 21 each of the two pistons 206 and 211 abuts a corresponding ring 214 with each of the two rings held against a corresponding inner circumferential stop shoulder 215 by a corresponding coil spring 216 inside the cylinder. Thus the two coil springs 216 bias the cylinder block 36 to its center zero speed position.

The four-way valve 202 is supplied with actuating fluid by a passage 218 and controls flow through two passages 220 and 222 to the two cylinders 208 and 212 respectively to actuate the cylinder block. Since the four-way valve 202 is of substantially the same construction as the first described four-way valve 165 and functions in the same manner it need not be described in detail. The input disc (not shown) of the four-way valve 202 is freely rotatable on the shaft 203 that fixedly carries the cylinder block 36 and the input disc is united with a radial valve arm 225 for rotation therewith. The valve arm 225 is forked to straddle a pin 226 on a long arm of a bellcrank 228. The bellcrank 228 is mounted on a pivot 230 and the shorter arm of the bellcrank carries a follower in the form of a roller 232 for cooperation with the cam 71. A suitable spring 234 acting on the bellcrank continuously urges the bellcrank to rotate in a counterclockwise direction as viewed in FIG. 12 to cause the follower 232 to press against the working surface of the cam 71 and thereby cause the valve arm 225 to be oscillated in accord with changes in elevation of the working surface of the cam. The output disc (not shown) of the four-way valve 202 is keyed to the shaft 203 to rotate with the cylinder block 36. The bellcrank functions as motion multiplying means.

At the normal relative positions of the input and output discs of the four-way valve 202 both of the passages 220 and 222 are cut off to immobilize the cylinder block 36. When the valve arm 225 is swung in either direction out of its normal position relative to the output disc of the four-way valve, fluid under pressure is supplied to one of the two cylinders 208 and 212 and simultaneously fluid is released from the other of the two cylinders to cause the cylinder block 36 to rotate in the same direction as the valve arm to restore the normal relationship between the two discs of the four-way valve.

The clutch program valve 162 which may be termed a commutator valve comprises two valve discs positioned face-to-face, one valve disc being a fixed valve disc with four ports a – d which correspond to the four clutches A – D, the four ports being connected to four corresponding control passages a' – d'. In addition the fixed disc has a fifth port 245 for detecting the zero-speed position of the commutator valve, the fifth port being connected to what may be termed a zero-speed detector passage 246.

The rotatable disc of the clutch commutator valve 162 is keyed to the program shaft 163 and has a pair of diametrically opposed arcuate lands 248 and 250 to control the ports a and b and has a second pair of diametrically opposed arcuate lands 252 and 254 to control the ports c and d. Whenever any one of the four valve ports a – d is not cut off by one of the arcuate lands of the commutator valve, the corresponding control passage a' – d' is vented to the environment of the commutator valve.

Hydraulic fluid to actuate the four clutches A – D as well as to supply the two 4-way valves 165 and 202 is supplied by a pump 255 that is driven by the engine of the vehicle and therefore the output of the pump varies with the speed of the engine. The pump delivers the pressurized fluid to an inlet passage 256 where at the maximum speed of the engine the fluid pressure may be, for example, 265 psi. The hydraulic fluid is reduced in pressure by passing through a flow-restricting valve designated U into a supply passage 258 which may be termed a control pressure passage and which terminates in a relief valve 260. Pressurized fluid to actuate the four clutches flows from the supply passage 258 through a passage 262 to what may be termed a re-start safety valve designated G and the previously mentioned passage 175 for supplying fluid to the two four-way valves branches from the passage 262.

Valve U has a valve member 264 that is urged upstream by a spring 265, the valve member having a flow-restricting inlet orifice 266 at its leading end. As long as the engine is operating well above idling speed, the dynamic pressure of fluid flowing through the intake passage 256 causes the valve member 264 to retract sufficiently to close passage 342 leading to valve V.

Valve G has utility only when the engine is stalled while the vehicle is in gear. In that event, the drop in oil pressure resulting from killing the engine causes disengagement of the clutches and when the engine is again started the function of valve G is to prevent the engagement of any clutches unless the control system is returned to its zero-speed state.

At the open position of valve G shown in FIG. 12 the fluid for actuating the clutches flows from valve G to valve X through a short passage 272 and from valve X flows through a passage 274 to clutch valves M-1 and M-2. Valve M-1 supplies actuating fluid to clutches A and C and valve M-2 supplies actuating fluid to clutches B and D.

Figure 11A:
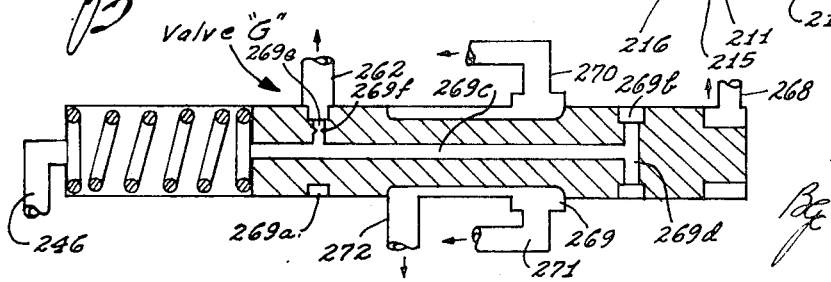
FIG. 11a is a simplified sectional view of valve G in FIG. 12.

Turning now to FIG. 11a showing the specific structure of valve G, passage 262 terminates at an intermediate point along the length of valve G; passage 268 terminates at the right end of the valve; and the valve cage is formed with a circumferential groove 269 between the two passages. A passage 270 vents the circumferential groove 269; a passage 271 places the circumferential groove 269 in communication with the left end of a valve x; and a passage 272 extends from valve G to valve X.

The spool of valve G has a circumferential groove 269a near its left end and a second circumferential groove 269b spaced from its right end. An axial bore 269c into the spool from its left end terminates at a diametrical bore 269d that communicates with a circumferential groove 269b and a radial bore 269e that has a restriction 269f extends from the axial bore to circumferential groove 269a.

When the engine is started pressure is always available to valve G through both line 268 and line 262. At the right spring-actuated limit position of the spool shown in FIG. 11a passage 262 is blocked; passage 272 is opened to passage 270; axial bore 269c of the spool is blocked; and spool groove 269a is open to line 262 and is open through orifice 269f to the axial bore 269c of the spool.

In the normal sequence, when starting the engine builds up oil pressure, oil from the passage 262 flows through the restriction 269f into the axial bore 269c of the spool and out of the left end of valve G through check valve 314 into passage 246 to the vent port 245 in the clutch commutator valve 162. As pressure from passage 268 continues to move the spool of valve G to the left, the spool eventually closes off spool groove 269a and opens the axial bore 269c of the spool to vent through passage 270. From this point on, valve G remains open to allow oil flow from passage 262 into passage 272 and on into the clutch control spools.

Should the engine stop while the transmission is operating at a specific speed ratio, valve G moves to its right limit position and passage 246 is closed because port 245 on the clutch commutator is out of its neutral or vent position. When the engine is restarted (it can only be done when the master control is in neutral because of an electrical interlock with the starter system) oil flows through passage 262 into the spool groove 269a and through orifice 269f and axial bore 269c into passage 246. This action pressurizes the left end of valve G and thus keeps the valve spool at its right closed position. With the control handle 80 left in neutral, servo valves 165 and 202 (still supplied with power through passage 175) eventually cycle back to neutral. When the servo valves are cycled back port 245 of the commutator valve 162 opens and thus vents passage 246. With this passage vented, pressure drops in the left end of valve G and the valve spool moves immediately to its left position to make power again available to the clutch control valves.

Valve X is normally held by spring pressure in its rightward position shown in FIG. 12 to permit free flow of hydraulic fluid to the four clutches but if the previously mentioned pedal 120 is depressed for an emergency stop and the engine is operating at a relatively low speed or decelerates to a relatively low speed, pressurized fluid is admitted to the right end of valve X to shift the valve spool to its alternate left position shown in FIG. 21 where the valve spool cuts off the supply passage 272 and instead connects passage 274 to a passage 271. From passage 271 the released clutch-actuating fluid flows through a circumferential groove 269 of the spool of valve G into vent line 270. As will be explained, valve X is controlled by valves V and Y.

From valve M-2 fluid to engage clutch B flows through a passage 280 and fluid to engage clutch D flows through a passage 282. Fluid to engage clutch A flows from valve M-1 through a passage 283 to a valve N and flows from valve N to the clutch through a passage 284. In like manner, fluid for engaging clutch C flows from valve M-1 to valve N through a passage 285 and from valve N flows to the clutch through a passage 286. Valve N cuts off clutches A and C when the master control 80 is in neutral position at zero vehicle speed and thus serves as safety means to make sure that the vehicle stays in free-wheeling.

The spool of valve N is urged towards its left closed position by spring pressure and may be shifted to its rightward open position by fluid pressure coming through passage 287 that is provided with a restriction 288. Venting the passage 287 below the restriction to release fluid faster than it can be supplied through the restriction results in valve N bein closed by spring pressure. Valve N also closes when the transmission is operating in high speed reverse. Valve N also closes when the engine is killed, the valve staying closed long enough when the engine is killed to permit the control system to recycle, i.e., to permit the program means comprising the cam 71 and the commutator valve 162 to return to their zero speed positions.

In each of the two clutch valves M-1 and M-2, the valve spool is spring biased to seek a center position and for this purpose two springs 290 at the opposite ends of the valve spool act on corresponding slidable rings 292 to urge the rings against corresponding inner circumferential stop shoulders. If the valve spool is not subjected to a longitudinal fluid pressure differential, the two springs hold the corresponding rings against the corresponding stop shoulders with the two rings confining the valve spool at its center position as shown in FIG. 19.

It is to be noted in FIG. 19 that the center land 295 of a valve spool is narrower than the passage 274 that supplied the clutch-actuating fluid. Therefore, when the spool of valve M-1 is in its center position, actuating fluid is supplied to both of the clutches A and C and when the spool of valve M-2 is in its center position, actuating fluid is supplied to both of the clutches B and D. Thus when the spool of valve M-1 moves through its center position, it causes overlapping operation of clutches A and C as required in the transition between range I and range II in FIG. 6 and in like manner when the spool of clutch valve M-2 moves through its center position it permits overlapping operation of clutches B and D as required in the transition from range II to range III.

The spool of each of the clutch valves M-1 and M-2 has bleeder passages 296 in its opposite ends through which a portion of the clutch-actuating fluid may flow into the opposite ends of the valve cage to act on the opposite ends of the spool. Thus if the valve spool is in its center position with the clutch-actuating fluid feeding to both ends of the valve cage, confining the fluid in one end of the valve cage and venting the other end of the valve cage creates a pressure differential across the valve spool to shift the valve spool towards the vented end of the valve cage.

Clutch commutator valve 162 controls the two valves M-1 and M-2 by simply venting the opposite ends of the two valve cages selectively. For this purpose passage $a'$ connects port $a$ of the clutch commutator valve to the left end of valve M-1 and passage $c'$ connects port $c$ of the commutator valve with the right end of valve M-1. In like manner passage $b'$ connects port $b$ of the commutator valve with the right end of valve M-2 and passage $d'$ connects port $d$ of the commutator valve with the left end of valve M-2.

Figure 13:
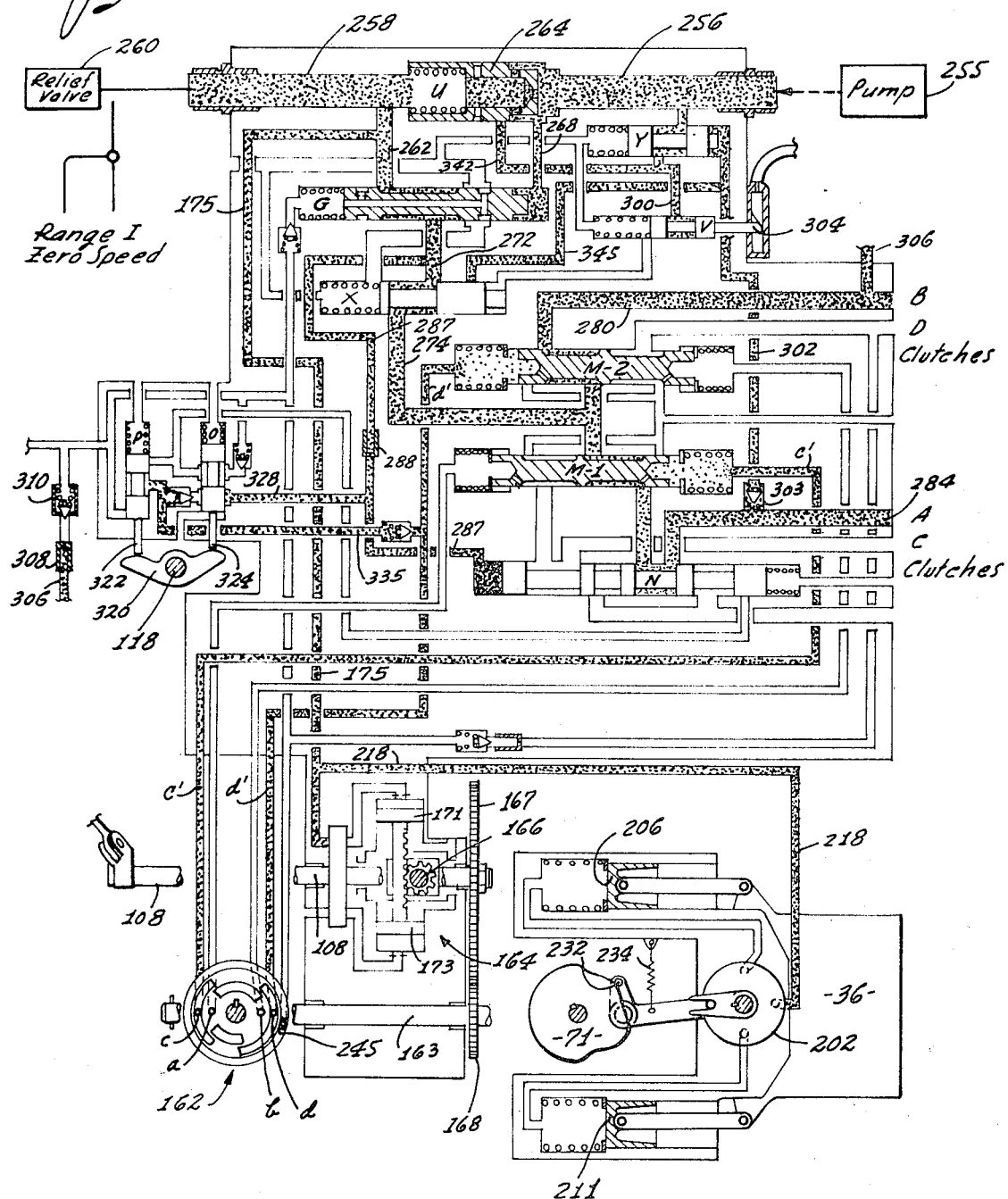

Referring now to valves Y and V which are involved in making emergency stops, high pressure fluid is available to valve Y through a passage 298 and may flow through the valve to a passage 300 that communicates both with valve V and valve U. The spool of valve Y is urged by spring pressure to its rightward position shown in FIG. 12 at which it cuts off fluid flow through the valve. When clutch A is engaged, fluid pressure is supplied to the right end of the cage of valve Y to shift the valve spool to open position as shown in FIG. 13, the fluid pressure being supplied by a passage 302 from the passage 284 that actuates valve A. Thus valve Y is shifted to its open position whenever clutch A is engaged. The passage 302 that supplies the actuating pressure to valve Y has a check valve 303 therein with a bleeder passage through the check valve, the bleeder passage serving to vent the right end of valve Y when clutch A is disengaged.

The spool of valve V is normally held in its rightward position shown in FIG. 12 by spring pressure with a nose 304 of the valve spool extending into the previously mentioned cam guide 152 in the path of the linear cam 150 that is actuated by the foot pedal 120. When the foot pedal 120 is depressed the inclined leading face of the cam 150 causes valve V to open and thereby place passage 300 in communication with a passage 305 that leads to the right end of valve X to cause valve X to release any clutches that may be engaged at the time.

One end of a passage 306 is shown on the right side of FIG. 12 and the other end is shown on the left side of FIG. 12, the intermediate portion of the passage being omitted for clarity of illustration. The right end of passage 306 communicates with passage 280 of clutch B to be pressurized whenever clutch B is engaged. The left end of passage 306 is equipped with a restricting orifice 308 and a check valve 310 and communicates with the previously mentioned conduit 160. One end of the conduit 160 supplies fluid pressure to the cylinder 154 shown in FIGS. 10 and 11 for actuating the previously mentioned lockout pin 155. The other end of passage 106 shown at the left of FIG. 12 communicates with a passage 312 of the control system, which passage communicates both with the valve P and the previously mentioned zero-speed detector passage 246.

The zero-speed detector passage 246 extends from the zero-speed detector port 245 of the commutator valve 162 to the left end of the valve G. A check valve 314 in the zero-speed detector passage permits the left end of valve G to vent into the zero-speed detector passage 246 if the zero-speed detector passage is vented but prevents fluid flow into the end of valve G from the zero-speed detector passage 246 when the zero-speed detector passage is pressurized. On the right side of FIG. 12, a passage 315 from the passage 282 for actuating clutch D communicates with the zero-speed detector passage 246 and is provided with a restricting orifice 316 and a check valve 318, the check valve serving to prevent venting of the zero-speed detector passage 246 through the passage 315 when clutch D is not engaged.

Since either clutch B or clutch D is engaged whenever the clutch commutator valve 162 is out of its zero-speed position that is shown in FIG. 12, the two passages 306 and 315 associated with clutches B and D respectively insure that the zero-speed detector passage 246 is pressurized at all times when the vehicle is traveling with the clutch commutator valve 162 out of its zero-speed position. Thus the lock-out pin 155 serves to prevent the master control 80 from being shifted either into or out of the high speed reverse slot 86 in the panel 81 unless the program means comprising the cam 71 and the commutator valve 162 is returned to its zero-speed position.

Valves P and O are operated by the two arms respectively of a rocker 320 on the previously mentioned input shaft 118 of FIG. 8 that responds to lateral shifting of the master control 80. One arm of the rocker 320 abuts a pin 322 to lift the spool of valve P and the other end abuts a pin 324 to lift the spool of valve O. When the master control 80 is in its neutral position, the rocker 320 is in its neutral position shown in FIG. 12 with the spool of valve P at its lower closed position and with the spool of valve O at its lower open position. When the master control is in its rightward position for operating the transmission in the three forward speed ranges or in the low speed reverse range, rocker 320 is tilted to raise the spool of valve O to the closed position as indicated in FIGS. 13 - 17 and 20, the spool valve P remaining in its lower closed position.

Figure 18:
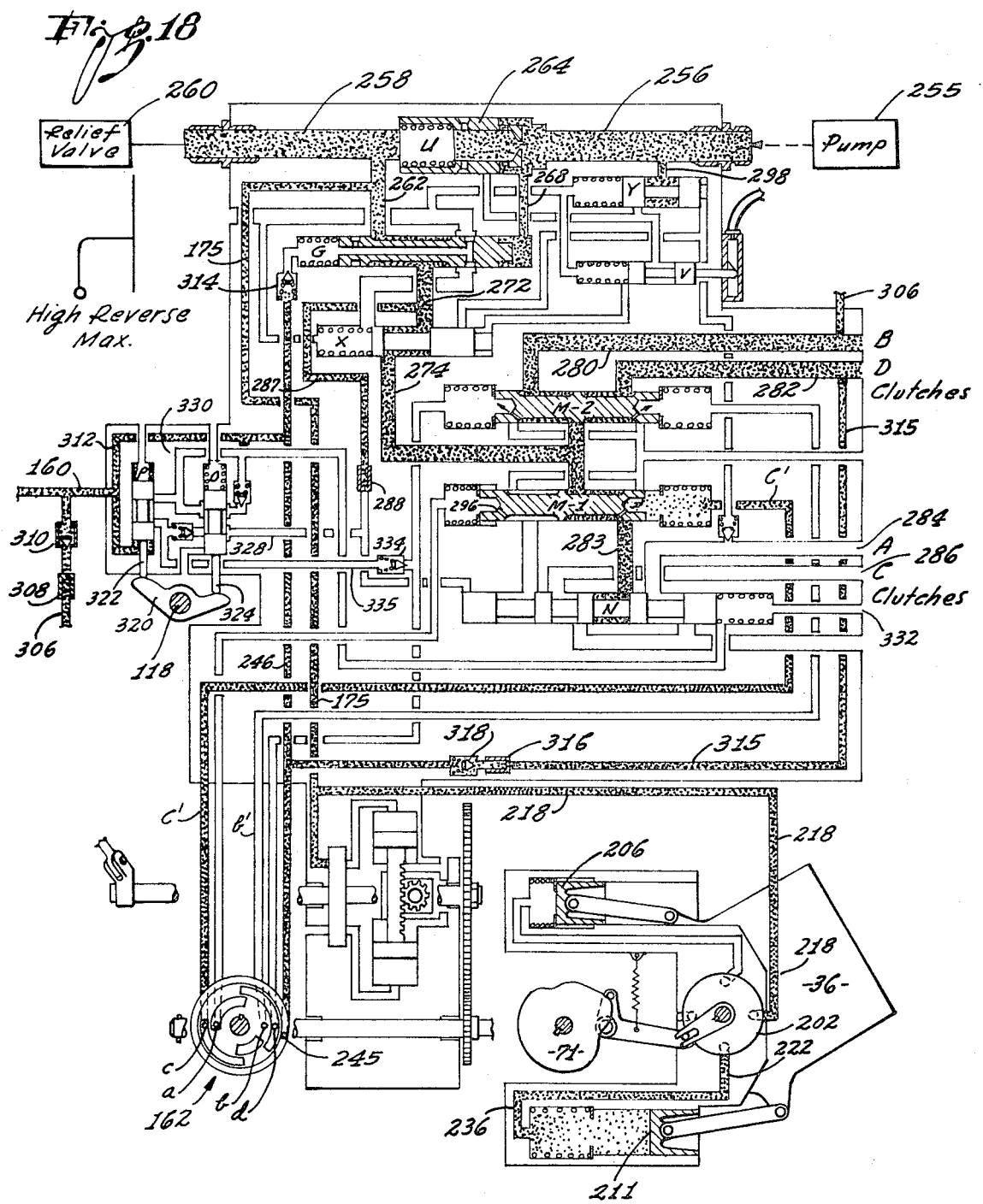

On the other hand, when the master control 80 is shifted leftward from its neutral position for high speed reverse, rocker 320 is tilted in the opposite direction as shown in FIG. 18 to lift the spool of valve P to open position, the spool of valve O remaining in its lower open position. Once the spool of valve P is elevated by the rocker 320 while the zero-speed detector line 246 is pressurized, the zero-speed detector line provides pressurized fluid to the lower end of valve P by the previously mentioned passage 312, to keep the spool of valve P elevated independently of the rocker 320 until the zero-speed detector passage is vented by return of the clutch commutator valve 162 to its zero speed position.

As heretofore explained, the movements of the clutch commutator valve 162 and the cam 71 that are employed for high speed reverse are the same movements that are employed for the first forward speed range. Therefore, when the master control 80 is in its leftward high speed reverse range, some means must be provided to cause clutches B and D to be engaged instead of clutches A and B. Valve P and O serve this purpose because when the master control is in high speed reverse, valve O vents the left end of the valve N to cause clutch A to be disengaged and valve P is actuated by rocker 320 to cause spool M-2 to be centered for simultaneous engagement of clutches B and D.

See Fig. 18 which shows the control system in the mode for high speed reverse. In FIG. 18 as well as in FIG. 12 the spool of valve O is in its normal lower limit position to open a vent path from the left end of valve N to cause valve N to close and thereby cut off clutches A and C. The vent path comprises the portion of passage 287 below the restriction 288, a passage 328, valve O, a passage 330 to the right end of the cage of valve N and a vent passage 332 from the right end of the cage.

At the same time with the spool of valve P elevated by the rocker 320 and left end of valve M-2 is vented by the following path: passage d', a check valve 334, a passage 335, valve P, passage 330 from valve P to the right end of the cage of valve N and the previously mentioned vent passage 332 from the right end of valve N. Since the right end of valve M-2 is already vented by passage b', the simultaneous venting of the left end of valve M-2 causes the spool of the valve to seek the center position shown in FIG. 18 for engagement of both clutches B and D as required for high speed reverse. Thus, in effect, when the master control is shifted to the high speed reverse range, means is provided to intervene between the clutch commutator valve 162 and the clutch valves M-1 and M-2 to cause the particular clutches to be engaged that are required for the high speed reverse range instead of the clutches that are used for the first forward speed range. The check valve 334 prevents fluid from flowing from passage 335 into passage *d'* when passage *d'* is being vented for engagement of clutch D.

THE DIFFERENT MODES OF OPERATION OF THE CONTROL SYSTEM

A. The master control in neutral position

FIG. 12

In each of the diagrammatic views, FIGS. 12 – 21, a small diagram in the upper left corner of the view indicates the position of the master control 80, as viewed by the operator. Also in each of FIGS. 12 – 21, the pressurizing of various passages is indicated by stippling.

In FIG. 12 where the master control is at its neutral position, the cam 71 is in the position of rotation at which the follower 232 is at the zero-speed position indicated at 75 in FIG. 7 and consequently the cylinder block 36 of the hydraulic drive unit is at its central zero-speed position. With the engine brought up to rated transmission operating speed, fluid flow is provided through passage 262 and with the spool of valve G held at its leftward position by pressure from the high pressure inlet passage 256, fluid pressure is supplied through valves G and X to the clutch valves M-1 and M-2.

The clutch commutator valve 162 is at its zero-speed position at which it vents the zero-speed detector passage 246 and vents the passages *a'* and *b'* to call for engagement of clutches A and B. Since the zero-speed detector line 246 is vented, the lockout pin 155 shown in FIGS. 10 and 11 is retracted to permit the operator to shift into either forward or high speed reverse as he desires.

The venting of passage *b'* by the commutator valve 162 causes clutch B to be engaged but results in no vehicle movement because motor pump 34 is not turning and clutches A, C and D are not engaged. Also, because only the one clutch is engaged the vehicle is in a free wheeling mode.

The venting of passage *a'* shifts the spool of valve M-1 but does not result in engagement of clutch A because valve N cuts off the clutch. The spool of valve N is in its leftward position because the open valve O vents the left end of valve N in the manner heretofore described. High pressure fluid from inlet passage 256 is available to valve Y but valve Y is closed because clutch A is not engaged to cause passage 302 to be pressurized. Valve V is in its normal closed position in the absence of depression of the emergency foot pedal 120.

B. The master control at its leftward zero-speed position for either forward movement into range I or rearward movement into low speed reverse.

FIG. 13

One change from FIG. 12 is that since the operator has shifted the master control rightward from its neutral position, the spool of valve O is elevated to its closed position by rocker 320 with the consequence that fluid pressure builds up in passage 287 below the restriction 288 by flow through the restriction to cause the spool of valve N to be shifted to its rightward position to cause clutch A to be engaged by the leftward positioning of valve M-1. The pressurizing of clutch A causes pressurizing of passage 302 to shift the spool of valve Y to its left position whereby fluid pressure is made available to valve V in the event that the operator should depress the foot pedal 120 for an emergency stop.

With both clutches A and B engaged and with the master control at zero position at the juncture of the forward speed slot 84 and the low speed reverse slot 85, the cylinder block 36 of the hydraulic drive unit is at its central zero-speed position. The operator can inch the vehicle forward or rearward by inching the master control forward or rearward to cause the cylinder block 36 to swing correspondingly out of its central position.

C. The master control set for maximum output speed in forward range I.

FIG. 14

The master control is in the position indicated in the diagram which position is at the upper end of the first range of forward speed. As a result of this advance in the position of the master control, the clutch commutator valve 162 and the cam 71 have advanced to corresponding positions and at the new position of the cam the cylinder block 36 is tilted in one direction to a limit position which synchronizes the input and output members of clutch C.

Figure 14:
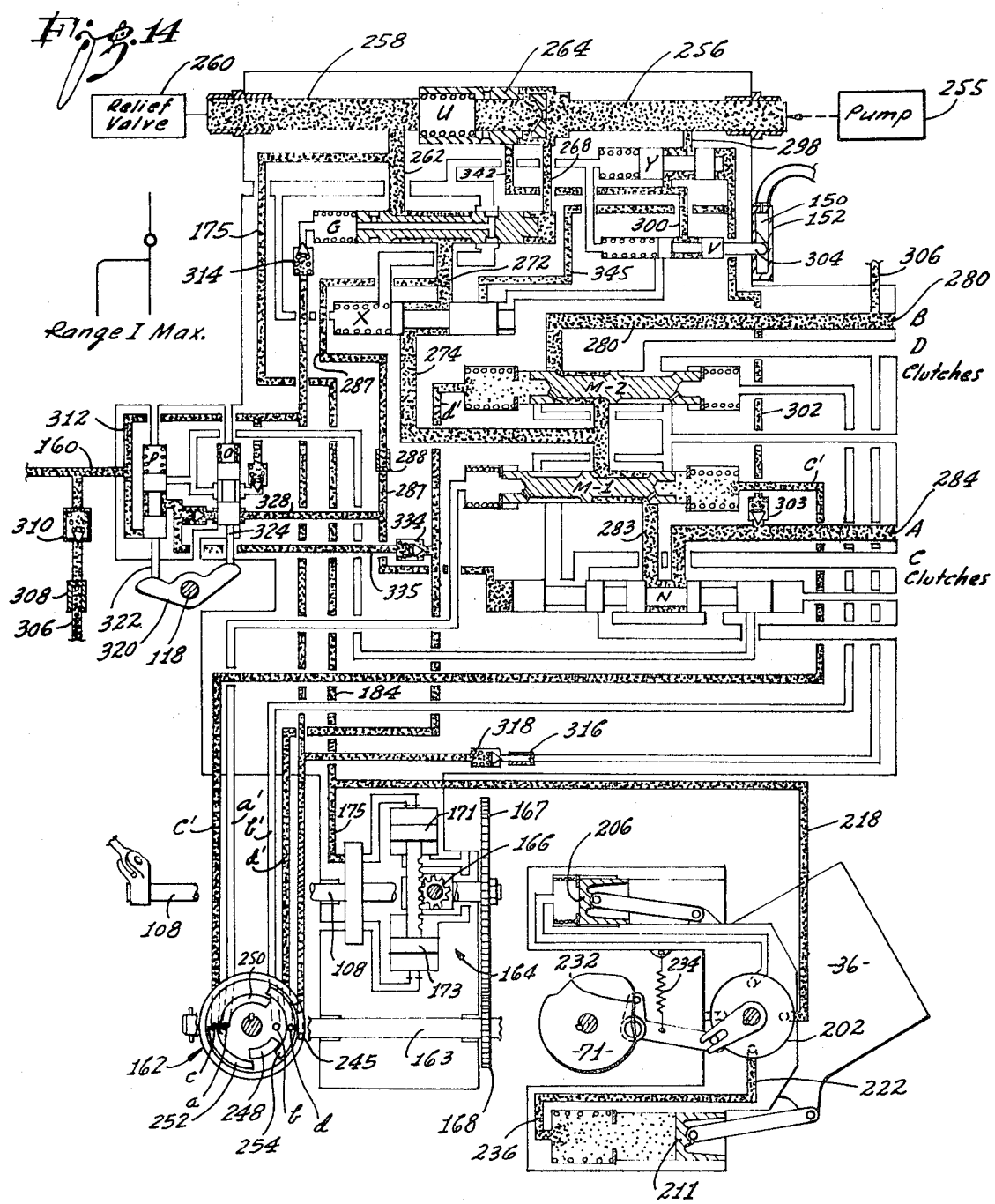

Referring to FIG. 6, the control system is at the beginning of the transition from range I to range II where the first dwell of the cam permits the clutch commutator valve 162 to carry out the overlapping operation of clutches A and C. As viewed in FIG. 14, the disk of the commutator valve 162 that carries the four arcuate lands has been rotated by the program shaft 163 counterclockwise to the transition. At the beginning of the transision, valve ports *a* and *b* are uncovered and valve port *c* is cut off by land 252. As the transition progresses a point is reached which is illustrated in FIG. 14 at which valve port *a* is partially covered by the leading end of land 250 and valve port *c* is partially uncovered by retreating land 252. At this point where both valve ports *a* and *c* are partially uncovered, both ends of clutch valve M-1 are vented to cause the spool of valve M-1 to be centered by its opposed springs and with the spool centered, the two clutches A and C are engaged simultaneously. Towards the end of the transition arcuate land 250 completely cuts off valve port a and arcuate land 252 completely uncovers valve port c to cause the spool of valve M-1 to shift to its leftward position to engage clutch C for carrying out the second speed range. The circumferential extent of the cam dwells for the two transitions are at the minimum to avoid any sensation by the operator of an appreciable pause or flat spot in the response to the master control.

D. The master control set for the upper end of forward range II.

FIG. 15

The transition to the second stage has been completed and the operator has moved the master control forward to the position indicated in the upper left diagram for maximum speed in the second range. The disengagement of clutch A has removed pressure from the right end of valve Y to permit the valve to return to its closed position. Valve Y is returned to its closed position because if an emergency stop were made at this time, the clutches should remain engaged temporarily to permit the engine to assist in the initial deceleration of the vehicle.

Figure 15:
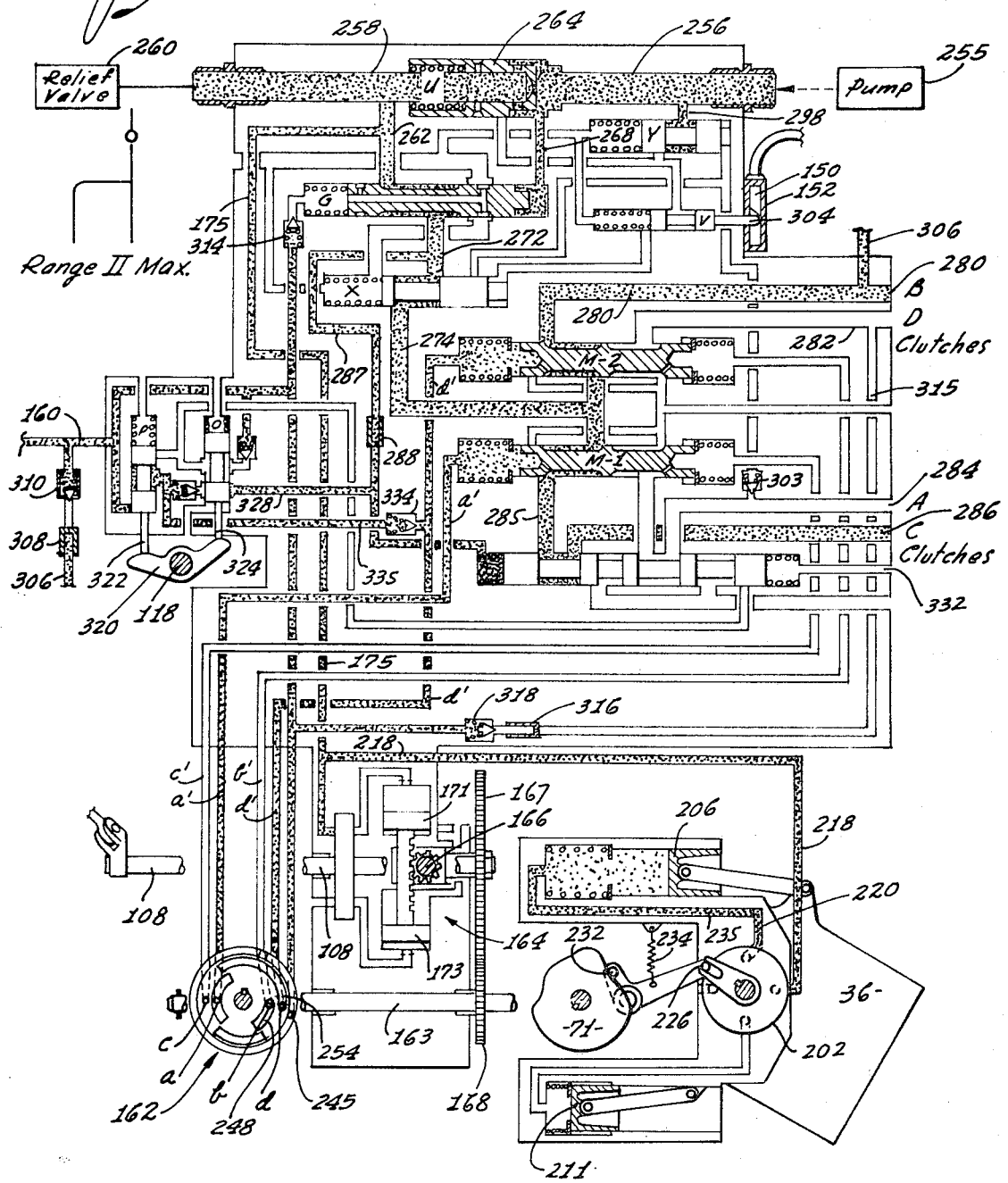
Figure 17:
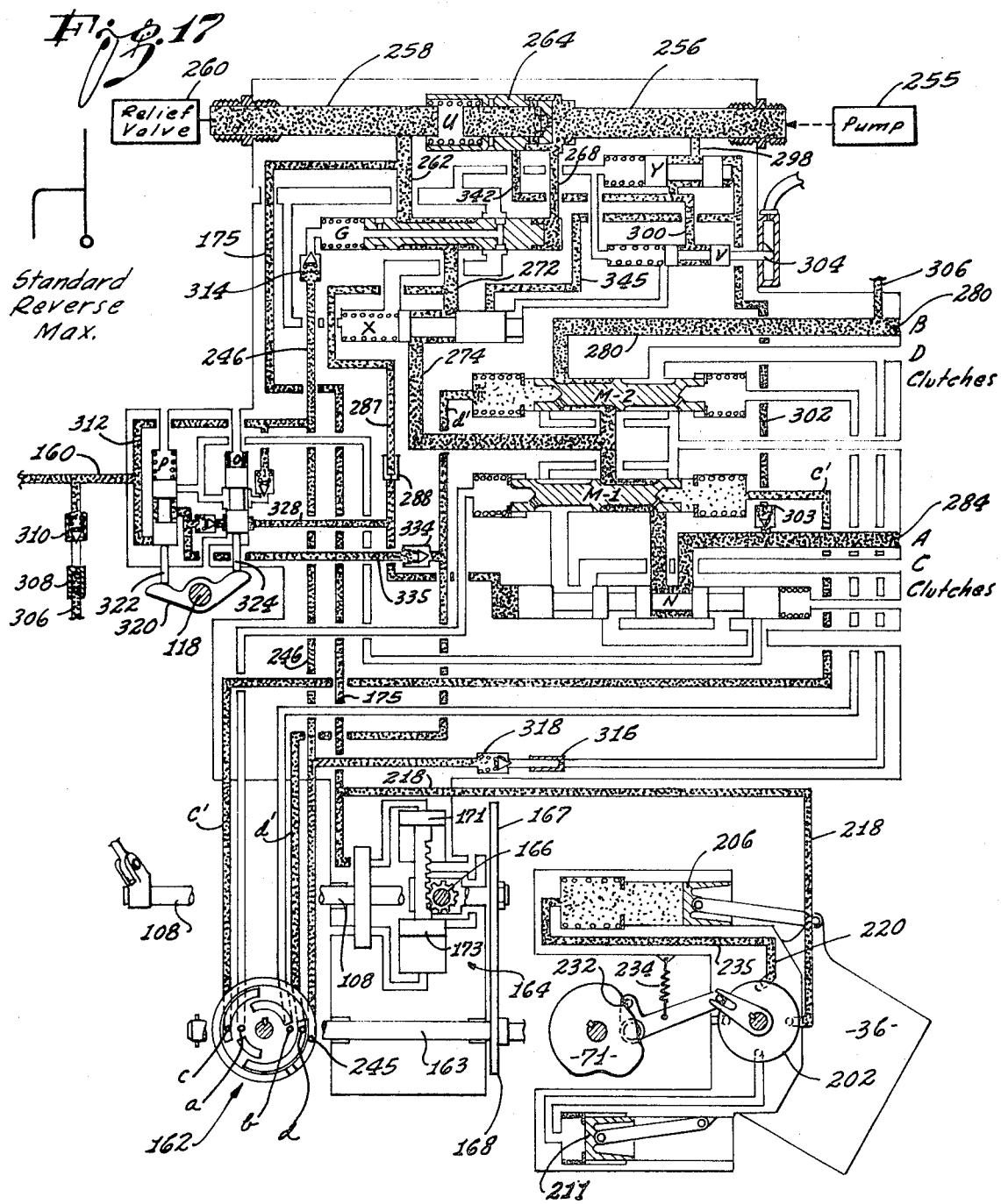

The clutch commutator valve and the cam have followed the forward movement of the master control and the control system is now at the threshold of the transition between the second stage and the third stage where, as indicated in FIG. 6, with the cylinder block of the hydraulic drive unit at this particular limit position all of the components of the planetary gearing rotate at the same speed so that, in effect, the planetary gearing is locked up to rotate as a unit to permit the required overlapping clutch operations. The second dwell of the cam permits the clutch commutator valve to carry out overlapping operation of clutches B and D. At the intermediate point in the transition which is illustrated in FIG. 15, short arcuate land 248 advances to partially cover valve port $b$ and at the same time the retreating arcuate land 254 partially uncovers valve port $d$ and with both of these two valve ports partially uncovered the spool of clutch valve M-2 shifts to its center position for simultaneous engagement of clutches B and D. Towards the end of the transition, valve port b is completely masked by arcuate land 248 and valve port d is completely unmasked by arcuate land 254 to leave clutches C and D engaged for carrying out the third speed range.

E. The master control set for the upper end of the third forward speed range.

FIG. 16

The master control has been advanced to the limit position indicated in the upper left diagram which represents the maximum speed at the upper end of the third speed range. The clutch commutator valve and the cam have advanced accordingly and the cylinder block 36 that is controlled by the cam is again at a limit position in accord with the graph in FIG. 6. The zero position detector line 246 is now pressurized by clutch D instead of clutch B.

Fluid pressure has been admitted to the lower end of valve P to lift the valve spool to open position but the opening of the valve is merely incidental and serves no purpose.

F. The master control at the maximum end of the low speed reverse range

FIG. 17

Starting with the master control at its left zero speed position the master control has been swung rearward to its rearward limit position indicated in the upper left diagram, which position is at the end of the low speed reverse range. The rearward swing of the master control has caused corresponding rearward movement of the clutch commutator 162 and the cam 71, i.e., clockwise movement as viewed in FIG. 17. As indicated in the graph in FIG. 6 the cylinder block 36 has been swung from its central zero-speed position at the beginning of this range to a limit position at the end of the range. The same clutches A and B are used in both this low speed reverse range and in the first forward speed range, the only difference between the two ranges being the direction in which the cylinder block 36 is swung from its zero-speed position.

G. The master control at the maximum end of the high speed reverse range

FIG. 18

With the clutch commutator valve at its zero position the zero speed detector line 246 is vented and consequently the lockout pin 155 is retracted to permit the master control to be shifted to the left as viewed by the operator and then swung rearward back to its limit position in the high speed reverse range as indicated in the upper left diagram. Throughout the movement of the master control in the three forward ranges and the low speed reverse range, the master control is inclined rightward from its neutral position as viewed by the operator with the consequence that the cross pin 102 in FIG. 8 engages the bevel gear 96 to cause the rotation of the clutch commutator valve and the cam to be forward or counterclockwise as viewed in FIG. 18 in response to forward movement of the master control.

When the master control is swung leftward as viewed by the operator from its neutral position into the high speed reverse range, the cross pin 102 in FIG. 8 releases bevel gear 96 and engages the bevel gear 98 to cause the three gears to function as reversing gearing for rotating the clutch commutator valve and the cam oppositely with respect to the direction of the swing of the master control. Thus although the master control is swung rearward to traverse the high speed reverse range, the clutch commutator valve and the cam behave as if the master control were being swung forward, the result being that rearward movement of the master control through the high speed reverse range causes the clutch commutator valve and the cam to rotate in the same manner as they do in the first forward range.

The clutch commutator valve itself calls for engagement of clutches A and B just as in the first forward range but the shift of the master control to the high speed reverse range causes the rocker 320 to open valve P in addition to valve O to cause clutches B and D to be engaged instead of clutches A and B. The open valve O vents the left end of valve N to permit the valve N to be closed by spring pressure as heretofore described to keep valve M-1 from causing engagement of clutch A. At the same time the opening of valve P vents the left end of clutch valve M-2 and since the right end of clutch valve M-2 is already vented by the clutch commutator valve, the spool of valve M-2 is centered by spring pressure to cause the required engagement of clutches B and D. Keeping the spool of valve N at its leftward closed position also provides the necessary vent path through the right end of the cage of valve N to release the fluid that bleeds through the left bleeder passage 296 of the spool of valve M-2.

It is to be noted that passage 312 places the lower end of valve P in communication with the zero-speed detector line 246 and since the zero-speed detector line is under pressure when the transmission operates in high speed reverse, the pressure from the zero-speed detector line acts against the lower end of the spool of valve P. The purpose of applying fluid pressure to the lower end of valve P at this time is to keep the valve open in the event that the master control is shifted out of high speed reverse into neutral with consequent release of the spool of valve P by the rocker 320. Thus if the operator shifts the master control back to neutral while the vehicle is operating in high speed reverse, valve P is kept open by fluid pressure to keep clutches B and D engaged until the vehicle speed stops. The zero-speed detector line remains pressurized until the commutator valve returns to its zero-speed position at which time it vents the zero-speed detector line.

H. The behavior of the control system when the engine is killed while the clutches are engaged.

FIG. 19

If the engine is killed while the vehicle is traveling the operator must return the master control to its neutral position to enable him to restart the engine. In such an event, the control system automatically disengages the clutches and inherently prevents any clutch to be engaged until the control system cycles back, i.e. until the program cam and the clutch commutator valve have returned to their starting positions corresponding to the neutral position of the master control. In FIG. 19 is is assumed that the engine stalled while the transmission was operating in the third forward speed range and that the operator has not only returned the master control to the neutral position as indicated by the upper left diagram but has also restarted the engine, the engine idling at the moment. If he so desires, the operator may shift the master control out of its neutral position to its right zero speed position to wait for the control system to cycle back.

Since the valve member 264 of valve U is sensitive to changes in the output of the hydraulic pump 255, the stopping of the engine causes the valve member to shift immediately to its right limit position shown in FIG. 19 and, of course, the cessation of oil flow causes the spool of valve G to be returned to its rightward closed position by spring pressure as shown in FIG. 19 to cut off fluid flow to the four clutches. When the engine is restarted, flow and pressure are immediately available through passages 262 and 175 for operating the two servo valves 165 and 202. In addition, the radial port 270 of the valve member 264 places the low pressure fluid in communication with the right end of valve G but as long as the clutch commutator valve 162 is out of its zero-speed position, the zero-speed detector passage 246 is kept under pressure to keep G from opening since valve G can open only if the left end of its valve cage can vent into the zero-speed detector passage. The valve member 264 of valve U has additional radial ports 340 which at engine idle open onto a shallow circumferential groove of the valve member and places low pressure fluid in communication with a passage 342 that communicates with the closed valve V but valve V serves no purpose at this time.

With the master control at its zero speed position, the two four-way valves 165 and 202 cycle back the clutch commutator valve 162 and the cam 71 to their zero positions. When the clutch commutator valve 162 does return to its zero-speed position, it vents the zero-speed detector line 246 and thus vents the left end of valve G whereupon the pressure supplied to the right end of the valve G causes the spool of the valve to shuttle to release clutch-actuating fluid to the clutches and the control system is then ready to respond to new positioning of the master control.

I. The functioning of the control system for an emergency stop while the vehicle is traveling at high speed.

FIG. 20

It is assumed in FIG. 20 that the emergency has occurred while the transmission is operating in the third forward speed range and that the operator has depressed the emergency stop pedal 120 to kick open valve V. The depression of the emergency stop pedal cuts the engine throttle to its idling setting and the operator keeps the foot pedal depressed until the vehicle stops, to avoid killing the idling engine by reengaging clutches. Although valve V is kicked to its open position the spool of valve X does not shift to its leftward position to release the clutches because the valve member 264 of valve U is initially fully retracted to its left limit position by the high flow in the intake passage 256 and at this extreme left position, valve member 264 cuts off the flow of pressurized fluid through the passage 342 to valve V to the right end of valve X. Thus when the foot pedal is depressed while the vehicle is traveling at high speed, the clutches remain engaged for an initial period to permit the engine to assist in the deceleration of the vehicle.

When the speed of the engine drops to approximately one third of the maximum speed in range III, the pressure differential across orifice 266 drops sufficiently for valve member 264 of valve U to advance to its limit position shown in FIG. 21 at which position the radial ports 340 of the valve member place the pressurized fluid in communication with the passage 342 for flow through the open valve V into the right end of valve X to cause the spool of valve X to shift to the left against spring force thereby to release actuating fluid from all of the clutches. With the vehicle decelerated at this point to a relatively low speed, the engine would be a hindrance rather than a help in the further deceleration of the vehicle. The vehicle is finally brought to a stop by continued application of the vehicle brakes. After the foot pedal is depressed for the emergency stop and the vehicle has been brought to a complete halt the operator must return the master control to the zero speed position to permit the commutator valve and the cam to cycle back to their zero-speed positions before he releases pedal 120.

As shown in FIG. 20, zero-speed detector line 246 is pressurized but the check valve 314 cuts off the left end of valve G from the pressurized fluid and it is also to be noted that the spool of valve G has an axial bore 269c which communicates with the previously mentioned diametrical bore 269d to vent the left end of valve G through a passage 270 thereby preventing interference with the leftward position of the valve spool.

J. The functioning of the control system for an emergency stop at relatively low vehicle speed

FIG. 21

As indicated by the upper left diagram it is assumed that the emergency stop is made when the transmission is operating in the first forward speed range. Since clutch A has been engaged in the first forward speed range, the spool of valve Y has been held in its left open position by fluid pressure supplied through passage 302 and the bleeder-equipped check valve 303 serves to maintain that pressure.

The open position of valve Y and the open position of valve V provide a path for flow of pressurized fluid from the control pressure passage 256 to the right end of valve X to cause the spool of valve X to be shifted to its left position where it cuts off the high pressure flow from the clutches and at the same time provides a vent path to release the clutches. The shift of the spool of valve X to its left limit position places the pressurized fluid in the right end of the valve cage into communication with a passage 345 that leads to the passage 302 and thus provides a path to keep the left end of valve Y pressurized to keep valve Y open in the absence of fluid pressure from clutch A. Thus the control system disengages the clutches A and B immediately to permit the vehicle to be decelerated by the vehicle brakes.

It is apparent that fluid pressure could be supplied from valve U to valve V through passage 342 to cause release of the clutches by valve X but a time delay would be involved and such a delay is avoided by the immediate flow of high pressure fluid through valve Y. The operator returns the master control to one of its zero speed positions and waits for the clutch commutator valve 162 to return to its zero-speed position.

MODIFIED EMBODIMENTS OF THE CONTROL SYSTEM

FIG. 23 indicates how the preferred embodiment of the control system may be modified in certain respects for simplification. Only a portion of the modified control system is shown, the remaining portion being identical with the preferred embodiment.

Much of the structure shown in FIG. 23 is similar to structure heretofore described as indicated by the use of corresponding numerals to indicate corresponding parts.

The panel 81a through which the master control 80a extends has the usual transverse slot 82, the usual slot 84 for forward speed ranges and the usual slot 85 for the low speed reverse range. A slot 86a, however, for the high speed reverse range is turned forward instead of rearward thus avoiding the necessity for reversing gearing to cause the clutch commutator valve and the cam to rotate in the same direction for high speed reverse range as for the forward speeds. The master control handle 80a straddles a shaft 88a and in the previously described manner is pivotally connected thereto by a diametrical pin 92a. In the previously described manner the lower end of the master control handle reciprocates a slidable shaft 95 which by means of linkage heretofore described causes an input shaft 118 to control a rocker 320.

The shaft 88a on which the master control handle 80a is mounted has an arm 104a that is connected by a link 350 with a spring-loaded lost-motion mechanism that is generally designated 352.

The lost-motion mechanism 352 has a cylinder 354 with a rigid extension thereof 355 connected to an arm 106a on an input shaft 108a. The cylinder 354 slidably retains a first disc 356 that normally backs against a first inner circumferential stop shoulder 358 and a second disc 360 that normally backs against a second inner circumferential stop shoulder 362, the two discs being urged towards the two corresponding stop shoulders by an intervening compression spring 364. The two discs 356 and 360 have central apertures through which the link 350 extends and the link is provided with a collar 365 which abuts the near side of the disc 356 and a second collar 366 which abuts the far side of the second disc 360.

When the input shaft 108a is in the rotary position corresponding to the instant rotary position of the shaft 88a that is controlled by the master control 80a, the two discs 356 and 360 are at maximum spacing from each other against the corresponding stop shoulders. If swinging movement of the master control 80a shifts the link 350 downwardly as viewed in FIG. 23 the collar 365 shifts the disc 356 downwardly with consequent compression of the spring 364. The spring recovers by forcing the disc 360 downwardly until the two discs are again positioned against their corresponding stop shoulders with consequent bodily downward shift of the lost-motion mechanism 352 and corresponding rotation of the input shaft 108a.

Preferably, but not necessarily, suitable rate control means is provided to retard the response of the input shaft 108a to the changes in position of the master control 80a. For this purpose an arm 368 on the input shaft 108a may be connected to a piston rod 370 of a dashpot cylinder 372 that is mounted to fixed structure by a pivot 374.

The previously mentioned servo positioner with its four-way valve 165 is omitted and instead the input shaft 108a is directly connected to the previously mentioned gear 166 that meshes with the smaller gear 168 for rotating the program shaft 163. The program shaft carries the usual clutch commutator valve 162 and the usual cam 71, the rest of the control system operating in the same manner as in the preferred embodiment of the invention.

It is apparent that the master control 80a is movable independently of the control system package and that the lost-motion mechanism 352 causes the program cam 71 and the commutator valve 162 to follow the changes in position of the master control with a lag or time delay introduced by the dashpot 372.

FIG. 24 shows how the structure of FIG. 23 may be modified to permit the master control 80a to be swung rearward instead of forward through the high speed reverse range. The panel 81a of FIG. 23 is replaced by the panel 81 of the preferred embodiment of the invention in which the slot 86 for the high speed reverse range extends rearward from the transverse slot 82. Since the master control 80a is swung rearward for the high speed reverse range, some kind of reversing gearing must be provided to carry out the function of the bevel gears 96, 98 and 100 of FIG. 8. In FIG. 24 this reversing function is carried out by bevel gears 376, 378 and 380 which are incorporated into the control system package.

In FIG. 24 an input shaft 108b corresponds to the input shaft 108a of FIG. 23 and carries a gear 382 which meshes with the bevel gear 376. In FIG. 24 a program shaft 384 carries the usual program cam 71 and the usual clutch commutator valve 162 and the program cam controls the cylinder block 36 of the hydraulic drive unit in the usual manner.

The program shaft 384 has a tubular extension 385 which is journalled in suitable bearings 386 and on which the two bevel gears 376 and 378 are rotatably mounted. A clutch rod 388 is slidingly mounted inside the tubular extension 385 and is normally held at the leftward position shown in FIG. 24 by a suitable coil spring 390. Small clutch elements 392 are mounted in apertures in the tubular extension 385 for releasable engagement with the bevel gear 376 and similar clutch elements 394 are mounted in apertures in the tubular extension for releasable engagement with the second bevel gear 378.

At the normal leftward position of the clutch rod 388 shown in FIG. 24, the clutch rod cams clutch elements 392 radially outward to engage the bevel gear 376 with the tubular extension, but a circumferential groove 395 of the clutch rod registers with clutch elements 394 to permit the second bevel gear 378 to spin freely on the tubular extension 385. When the master control is in a position for one of the three forward speed ranges or is in the low speed reverse range, the clutch rod 388 is in the normal position shown in FIG. 24 to cause the bevel gear 376 to rotate the program shaft 384 in the same manner as in the first embodiment of the invention.

When the master control handle is shifted to the rearwardly extending reverse speed slot of the panel, the clutch rod 388 is automatically shifted to its alternate rightward position at which the circumferential groove 395 of the cam rod moves out of register with clutch elements 394 to cause the clutch elements to be cammed outward into engagement with bevel gear 378. At the same time, a second circumferential groove 396 in the clutch rod moves into register with clutch elements 392 to release bevel gear 376 from the tubular extension 385. With the first bevel gear 376 free from the tubular extension 385 and the second bevel gear 378 engaged with the tubular extension, the tubular extension is rotated in reverse direction by the three bevel gears.

For automatic operation of the clutch rod 388, the left end of the clutch rod may abut a normally retracted piston 398 in a small cylinder 400, the piston being retracted by the pressure of the coil spring 390. Any suitable arrangement may be provided to introduce pressurized fluid into the cylinder 400 through a passage 402. For example, a second rocker arm 404 may be mounted on the previously mentioned input shaft 118 of FIG. 23 to act on a pin 405 to lift the spool of a valve W. At the normal lower position to which the spool of valve W is urged by spring pressure, the passage 402 from the cylinder 400 is vented through a vent line 406 but when the valve spool is lifted by rocker arm 404 it places the passage 402 in communication with a pressurized line 408 to cause actuation of the clutch rod 388.

Our description in specific detail of the selected embodiments of the invention will suggest various changes, substitutions and other departures from our disclosure within the spirit and scope of the appended claims.

We claim:

1. A control system for a vehicle that is driven by an engine through a transmission that includes planetary gearing and also includes a hydraulic drive unit that is adjustable for variably and reversibly driving a reaction component of the planetary gearing through a series of ranges of vehicle speed, the transmission further including clutches for activating gear trains for the series of ranges, said control system having in combination:
a manually operable master control movable through a series of ranges of movement corresponding to said series of ranges of vehicle speed;
program means movable through a series of ranges of movement corresponding to said series of ranges of vehicle speed,
said program means including a first programmer to program the adjustments of the hydraulic drive unit through the series of ranges of vehicle speed,
said program means including a second programmer connected to the first programmer to program the operations of the clutches through the series of ranges of vehicle speed,
said master control being movable independently of said program means; and
means responsive to the master control to urge the program means to positions corresponding to the instant positions of the master control with permitted lag in the movement of the program means.

2. A combination as set forth in claim 1 which includes means to control the rate of movement of the program means.

3. A combination as set forth in claim 1 in which said means to control the rate is connected to the master control.

4. A combination as set forth in claim 1 in which said master control is manually movable independent of the program means; and
which includes means to cause the program means to follow the movements of the master control.

5. A combination as set forth in claim 4 which includes means directly connected to the program means to control the rate of movement of the program means.

6. A control system for a vehicle that is driven by an engine through a transmission that includes planetary gearing and also includes a hydraulic drive unit that is adjustable for variably and reversibly driving a reaction component of the planetary gearing through a series of ranges of vehicle speed, the transmission further including clutches for activating gear trains for the series of ranges, said control system having in combination:
a manually operable master control movable through a series of ranges of movement corresponding to said series of ranges of vehicle speed;
program means movable in response to said master control through a series of ranges of movement corresponding to said series of ranges of vehicle speed,
said program means including a first programmer to program the adjustments of the hydraulic drive unit through the series of ranges of vehicle speed,
said program means including a second programmer correlated with the first programmer to program the operations of the clutches through the series of ranges of vehicle speed,
said master control being manually movable independent of the program means; and
means to cause the program means to follow the movements of the master control,
said means to cause the program means to follow the movements of the master control comprising a lost-motion connection between the master control and the program means together with spring means stressed by the lost-motion connection to urge the program means to positions corresponding to the instant positions of the master control.

7. A combination as set forth in claim 6 in which said means to cause the program means to follow the movements of the master control comprises:
an input member operatively connected to the master control for movement therewith;
an output member operatively connected to the program means for operation thereof; and
servo means operatively connected to the output member, said servo means being responsive to the input member to cause the output member to seek positions corresponding to the instant positions of the input member.

8. A combination as set forth in claim 7 which includes means to control the rate of response of the output member to changes in position of the input member.

9. A control system for a vehicle that is driven by an engine through a transmission that includes planetary gearing and also includes a hydraulic drive unit that is adjustable for variably and reversibly driving a reaction component of the planetary gearing through a series of ranges of vehicle speed, the transmission further including clutches for activating gear trains for the series of ranges, said control system having in combination:
a manually operable master control movable through a series of ranges of movement corresponding to said series of ranges of vehicle speed;
program means movable in response to said master control through a series of ranges of movement corresponding to said series of ranges of vehicle speed,
said program means including a first programmer to program the adjustments of the hydraulic drive unit through the series of ranges of vehicle speed,
said program means including a second programmer correlated with the first programmer to program the operations of the clutches through the series of ranges of vehicle speed, and
motion-amplifying means to increase the range of movement of said program means relative to the range of movement of the master control.

10. A combination as set forth in claim 1 in which said fluid-pressure-actuated adjustment means comprises a cam responsive to the master control and fluid-pressure-actuated means controlled by the cam to vary the adjustment of the hydraulic drive unit.

11. A combination as set forth in claim 10 which includes servo-positioner means having an input member and an output member,
said input member being operatively connected to the master control for simultaneous movement therewith,
said output member being connected both to said second programmer and to the cam for actuation thereof.

12. A control system for a vehicle that is driven by an engine through a transmission that includes planetary gearing and also includes a hydraulic drive unit that is adjustable for variably and reversibly driving a reaction component of the planetary gearing through a series of ranges of vehicle speed, the transmission further including clutches for activating gear trains for the series of ranges, said control system having in combination:
a manually operable master control movable through a series of ranges of movement corresponding to said series of ranges of vehicle speed;
program means movable in response to said master control through a series of ranges of movement corresponding to said series of ranges of vehicle speed,
said program means including a first programmer to program the adjustments of the hydraulic drive unit through the series of ranges of vehicle speed,
said program means including a second programmer correlated with the first programmer to program the operations of the clutches through the series of ranges of vehicle speed,
said master control being movable forwardly along a first path from a zero-speed position to advance through forward speed ranges,
said master control being movable rearwardly along a second path from a zero-speed position to advance through a reverse speed range,
said fluid-pressure-actuated adjustment means comprising a cam responsive to the master control and fluid-paessure-actuated means controlled by the cam to vary the adjustment of the hydraulic drive unit,
a portion of the cam being movable in a given direction both to advance through a given forward speed range and to advance through said reverse speed range; and
means to move said cam in said given direction both in response to advance of the master control forwardly through said given forward speed range and in response to advance of the master control rearwardly through said reverse speed range.

13. A combination as set forth in claim 6 which includes motion-reversing gearing and which includes means to make said motion-reversing gearing effective between the master control and the cam in response to shifting of the master control from said first path to said second path.

14. A combination as set forth in claim 13 in which said second programmer and said cam are interconnected for simultaneous movement so that a portion of the movement of the second programmer corresponds to said portion of the cam;
in which clutches for said given forward speed range are responsive to movement of the master control into and out of said first path; and
in which clutches for said reverse speed range are responsive to movement of the master control into and out of said second path.

15. A combination as set forth in claim 14 in which said second programmer is a control valve;
in which said clutches are operated by fluid pressure;
in which fluid-pressure-actuated clutch valves supply fluid pressure to the clutches selectively;
in which said clutch valves are responsive to changes in adjustment of said control valve; and
which includes means to change the responsiveness of the clutch valves to the control valve in response to shift of the master control from said first path to said second path.

16. A control system for a vehicle that is driven by an engine through a transmission that includes planetary gearing and also includes a hydraulic drive unit that is adjustable for variably and reversibly driving a reaction component of the planetary gearing through a series of ranges of vehicle speed, the transmission further including clutches for activating gear trains for the series of ranges, said control system having in combination:
a manually operable master control movable through a series of ranges of movement corresponding to said series of ranges of vehicle speed;
program means movable in response to said master control through a series of ranges of movement corresponding to said series of ranges of vehicle speed,
said program means including a first programmer to program the adjustments of the hydraulic drive unit through the series of ranges of vehicle speed,
said program means including a second programmer correlated with the first programmer to program the operations of the clutches through the series of ranges of vehicle speed;

two clutches for power flow from the hydraulic drive unit to the planetary gearing for a first forward speed range, both of said clutches being operable by fluid pressure;

a source of fluid pressure to actuate the two clutches; and means to cut off said source from one of the two clutches when said master control is positioned at its neutral position thereby to ensure that the vehicle is in free wheeling when the master control is at its neutral position.

17. A control system for a vehicle that is driven by an engine through a transmission that includes planetary gearing and also includes a hydraulic drive unit that is adjustable for variably and reversibly driving a reaction component of the planetary gearing through a series of ranges of vehicle speed, the transmission further including clutches for activating gear trains for the series of ranges, said control system having in combination:

a manually operable master control movable through a series of ranges of movement corresponding to said series of ranges of vehicle speed;

program means movable in response to said master control through a series of ranges of movement corresponding to said series of ranges of vehicle speed, said program means including a first programmer to program the adjustments of the hydraulic drive unit through the series of ranges of vehicle speed, said program means including a second programmer correlated with the first programmer to program the operations of the clutches through the series of ranges of vehicle speed;

a first piston included in said fluid-pressure-actuated adjustment means to advance to adjust the hydraulic drive unit in one respect;

a second piston included in said fluid-pressure-actuated adjustment means to advance to adjust the hydraulic drive unit in the opposite respect;

two springs to urge the two pistons respectively to advance;

stop means to terminate the pressures of the two springs respectively when the hydraulic drive unit is at neutral adjustment;

a four-way valve to control the application of fluid pressure to the two pistons thereby to control the adjustment of the hydraulic drive unit; and means responsive to the master control to control said valve to cause adjustments of the hydraulic drive unit to follow the movements of the master control.

18. A control system for a vehicle that is driven by an engine through a transmission that includes planetary gearing and also includes a hydraulic drive unit that is adjustable for variably and reversibly driving a reaction component of the planetary gearing through a series of ranges of vehicle speed, the transmission further including clutches for activating gear trains for the series of ranges, said control system having in combination;

a manually operable master control movable through ranges of movement corresponding to the ranges of said series of ranges of vehicle speed, said master control being movable in one direction from a given position through a forward speed range and being movable from the given position in the opposite direction through a reverse speed range, cam means operatively responsive to the movements of said master control, said cam means having a control surface of a profile corresponding to a graph of the changes in adjustment of the hydraulic unit through said ranges of the series of ranges of vehicle speed, said control surface of the cam having a point corresponding to said given position of the master control such control surface of the cam progressively changing in elevation in one respect in one direction from said point for said forward speed range and progressively changing in elevation in the opposite respect in the opposite direction for said reverse speed range, means to vary the adjustments of the hydraulic drive unit;

follower means cooperative with said control surface of the cam and operatively connected to said adjustment-varying means to program the adjustments of the hydraulic drive unit through said ranges of the series of ranges of vehicle speed; and means responsive to movements of the master control to program the operation of the clutches through said ranges of the series of ranges of vehicle speed, two of said clutches being engaged for both said forward speed range and said reverse speed range, whereby the master control may be gradually shifted forwardly and rearwardly from its zero-speed position to inch the vehicle forwardly through said forward speed range and rearwardly through said reverse speed range without disengaging said two clutches.

19. A combination as set forth in claim 18 in which the master control is movable laterally from said zero-speed position to release one of said two clutches to place the vehicle in free wheeling.

20. A combination as set forth in claim 19 in which said two clutches connect the hydraulic drive unit to two different components of the planetary gearing.

21. A combination as set forth in claim 18 in which the master control is operatively connected to the cam means by motion-amplifying means.

22. A combination as set forth in claim 18 which includes servo-positioning means having an input member and an output member;

in which motion-amplifying means operatively connects said follower to said input member; and in which the output member is operatively connected to said adjustment-varying means.

23. A combination as set forth in claim 18 in which said control surface of the cam includes dwells for pauses in the operation of said adjustment-varying means at transitions between successive ranges of speed to permit changing the clutches during the transitions.

24. A combination as set forth in claim 23 in which the means to program the operation of the clutches is constructed and arranged for overlapping operation of the clutches during the transition periods.

* * * * *